United States Patent
Hanschen et al.

(10) Patent No.: US 9,944,043 B2
(45) Date of Patent: Apr. 17, 2018

(54) LAMINATES AND METHODS OF MAKING THE SAME

(71) Applicant: 3M INNOVATIVE PROPERTIES COMPANY, St. Paul, MN (US)

(72) Inventors: Thomas P. Hanschen, Mendota Heights, MN (US); William H. Sikorski, Jr., White Bear Lake, MN (US); Ronald W. Ausen, St. Paul, MN (US); Paul S. Wallis, Swansea (GB); Vathsala Rajagopal, Woodbury, MN (US); William J. Kopecky, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 835 days.

(21) Appl. No.: 13/633,450

(22) Filed: Oct. 2, 2012

(65) Prior Publication Data
US 2014/0093703 A1  Apr. 3, 2014

(51) Int. Cl.
*B32B 3/26* (2006.01)
*B32B 5/14* (2006.01)
(Continued)

(52) U.S. Cl.
CPC .............. *B32B 5/142* (2013.01); *B32B 3/18* (2013.01); *B32B 25/10* (2013.01); *B32B 27/12* (2013.01);
(Continued)

(58) Field of Classification Search
CPC . B29C 47/0021; B29C 47/065; B29C 47/062; B32B 27/12; B32B 25/08;
(Continued)

(56) References Cited

U.S. PATENT DOCUMENTS

| 3,204,290 A | 9/1965 | Crompton |
| 4,087,226 A | 5/1978 | Mercer |

(Continued)

FOREIGN PATENT DOCUMENTS

| AU | B-73074/91 | 10/1991 |
| DE | 19806452 | 8/1999 |

(Continued)

OTHER PUBLICATIONS

PCT/US2012/051660, filed Aug. 21, 2012.
(Continued)

*Primary Examiner* — Brian Handville

(57) ABSTRACT

An incrementally activated laminate that includes an incrementally activated fibrous web and a film having alternating first and second regions and a laminate of the film and an extensible fibrous web. The first region of the film includes a first polymeric composition, and the second regions include an elastic polymeric composition that is more elastic than the first polymeric composition. In the incrementally activated laminate, the distance between midpoints of two first regions separated by one second region is smaller than the activation pitch, and the first regions are not plastically deformed. In the extensible laminate, a tensile elongation at maximum load of the film is up to 250 percent of the tensile elongation at maximum load of the extensible fibrous web. Methods of making the laminates are also described.

16 Claims, 9 Drawing Sheets

(51) Int. Cl.
   *B32B 25/10* (2006.01)
   *B32B 27/12* (2006.01)
   *B32B 3/18* (2006.01)
(52) U.S. Cl.
   CPC ....... *B32B 2307/51* (2013.01); *B32B 2555/00* (2013.01); *Y10T 156/10* (2015.01); *Y10T 428/24636* (2015.01); *Y10T 428/24694* (2015.01); *Y10T 428/24826* (2015.01); *Y10T 428/249921* (2015.04); *Y10T 442/60* (2015.04)
(58) Field of Classification Search
   CPC ......... B32B 2307/51; B32B 5/04; B32B 5/26; B32B 25/10; B32B 2038/0028; B32B 5/142; B32B 3/18; B32B 2555/00; Y10T 442/60; Y10T 428/249921; Y10T 428/24694; Y10T 156/10; Y10T 428/24636; Y10T 428/24826
   USPC .......................... 428/98, 152, 174, 175, 184
   See application file for complete search history.

(56) References Cited

U.S. PATENT DOCUMENTS

| | | |
|---|---|---|
| 4,435,141 A | 3/1984 | Weisner |
| 4,460,364 A | 7/1984 | Chen |
| 4,517,714 A | 5/1985 | Sneed |
| 4,525,407 A | 6/1985 | Ness |
| 4,533,510 A | 8/1985 | Nissel |
| 4,554,191 A | 11/1985 | Korpman |
| 4,725,473 A | 2/1988 | Van Gompel |
| 4,787,897 A | 11/1988 | Torimae |
| 5,017,116 A | 5/1991 | Carter |
| 5,120,484 A | 6/1992 | Cloeren |
| 5,143,679 A | 9/1992 | Weber |
| 5,151,092 A | 9/1992 | Buell |
| 5,156,793 A | 10/1992 | Buell |
| 5,167,897 A | 12/1992 | Weber |
| 5,196,000 A | 3/1993 | Clear |
| 5,196,247 A | 3/1993 | Wu |
| 5,221,274 A | 6/1993 | Buell |
| 5,366,782 A | 11/1994 | Curro |
| 5,422,172 A | 6/1995 | Wu |
| 5,429,856 A | 7/1995 | Krueger |
| 5,527,304 A | 6/1996 | Buell |
| 5,605,739 A | 2/1997 | Stokes |
| 5,620,780 A | 4/1997 | Krueger |
| 5,674,216 A | 10/1997 | Buell |
| 5,679,379 A | 10/1997 | Fabbricante |
| 5,773,374 A | 6/1998 | Wood |
| 5,800,903 A | 9/1998 | Wood |
| 5,840,412 A | 11/1998 | Wood |
| 5,851,935 A | 12/1998 | Srinivasan |
| 5,861,074 A | 1/1999 | Wu |
| 5,900,306 A | 5/1999 | Stopper |
| 5,993,940 A | 11/1999 | Ouderkirk |
| 6,001,460 A | 12/1999 | Morman |
| 6,030,372 A | 2/2000 | Buell |
| 6,069,097 A | 5/2000 | Suzuki |
| 6,090,234 A | 7/2000 | Barone |
| 6,096,668 A | 8/2000 | Abuto |
| 6,159,544 A | 12/2000 | Liu |
| 6,159,584 A | 12/2000 | Eaton |
| 6,190,758 B1 | 2/2001 | Stopper |
| 6,221,483 B1 | 4/2001 | Hilston |
| 6,245,401 B1 | 6/2001 | Ying |
| 6,476,289 B1 | 11/2002 | Buell |
| 6,669,887 B2 | 12/2003 | Hilston |
| 6,682,514 B1 | 1/2004 | Brunner |
| 6,767,492 B2 | 7/2004 | Norquist |
| 6,902,796 B2 | 6/2005 | Morell |
| 6,949,283 B2 | 9/2005 | Kollaja |
| 6,986,825 B1 | 1/2006 | Squires |
| 7,048,818 B2 | 5/2006 | Krantz |
| 7,172,008 B2 | 2/2007 | Vanbenschoten |
| 7,316,840 B2 | 1/2008 | Neculescu |
| 7,316,842 B2 | 1/2008 | Zhou |
| 7,329,621 B2 | 2/2008 | Collier, IV |
| 7,625,829 B1 | 12/2009 | Cree |
| 7,651,653 B2 * | 1/2010 | Morman et al. ........... 264/290.2 |
| 7,678,316 B2 | 3/2010 | Ausen |
| 7,727,207 B2 | 6/2010 | Erdman |
| 7,803,244 B2 | 9/2010 | Siqueira |
| 7,897,078 B2 | 3/2011 | Petersen |
| 7,897,081 B2 | 3/2011 | Ausen |
| 7,968,479 B2 | 6/2011 | Welch |
| 8,222,169 B2 | 7/2012 | Lake |
| 8,257,333 B2 | 9/2012 | Hancock-Cooke |
| 2003/0105446 A1 | 6/2003 | Hutson |
| 2005/0060849 A1 | 3/2005 | Vanbenschoten |
| 2007/0108229 A1 | 5/2007 | Fork |
| 2007/0134465 A1 | 6/2007 | Vanbenschoten |
| 2007/0154683 A1 | 7/2007 | Ausen |
| 2007/0298262 A1 | 12/2007 | Quiram |
| 2009/0258210 A1 | 10/2009 | Iyad |
| 2009/0306617 A1 | 12/2009 | Tsang |
| 2010/0215923 A1 | 8/2010 | Frost |
| 2010/0234823 A1 | 9/2010 | Morita et al. |
| 2011/0147475 A1 | 6/2011 | Biegler |
| 2011/0151171 A1 | 6/2011 | Biegler |
| 2011/0268906 A1 | 11/2011 | Ausen |
| 2012/0022490 A1 | 1/2012 | Marche |
| 2012/0052245 A1 | 3/2012 | Hoium |
| 2012/0172826 A1 | 7/2012 | Ng |
| 2012/0263906 A1 | 10/2012 | Ausen |
| 2012/0308755 A1 | 12/2012 | Gorman |

FOREIGN PATENT DOCUMENTS

| | | |
|---|---|---|
| EP | 0191355 | 8/1986 |
| EP | 865904 | 9/1998 |
| EP | 872580 | 10/1998 |
| EP | 1757429 | 2/2007 |
| EP | 2340796 | 9/2011 |
| JP | 8-300436 | 11/1996 |
| JP | 9-300436 | 11/1997 |
| WO | WO 99/47590 | 9/1999 |
| WO | WO 2001-45918 | 6/2001 |
| WO | WO 2004-091896 | 10/2004 |
| WO | WO 2008/002219 | 1/2008 |
| WO | WO 2009/042556 | 4/2009 |
| WO | WO 2009-140392 | 11/2009 |
| WO | WO 2010-109087 | 9/2010 |
| WO | WO 2011-119323 | 9/2011 |
| WO | WO 2011-119324 | 9/2011 |
| WO | WO 2011-119325 | 9/2011 |
| WO | WO 2011-119326 | 9/2011 |
| WO | WO 2011-119327 | 9/2011 |
| WO | WO 2012/027450 | 3/2012 |
| WO | WO 2012-038613 | 3/2012 |
| WO | WO 2014/134418 | 9/2014 |

OTHER PUBLICATIONS

PCT/US2012/050746, filed Aug. 14, 2012.
PCT/US2012/057900, filed Sep. 28, 2012.
U.S. Appl. No. 61/615,676, filed Mar. 26, 2012.
U.S. Appl. No. 13/633,396, filed Oct. 2, 2012.

* cited by examiner

LAMINATES AND METHODS OF MAKING THE SAME

BACKGROUND

The lamination of fibrous materials such as nonwovens to elastic films is a useful process for a variety of applications. For example, such laminates are useful in the limited-use garment industry. The fibrous material may be stretchable, or mechanical activation of the laminate may be useful for producing an elastic article.

In other technologies, co-extrusion of multiple polymeric components into a single film is known in the art. For example, multiple polymeric flow streams have been combined in a die or feedblock in a layered fashion to provide a top to bottom multilayer film. It is also known to provide co-extruded film structures where the film is partitioned, not as coextensive layers in the thickness direction, but as stripes along the width dimension of the film. This has sometimes been called "side-by-side" co-extrusion. Extruded products with side-by-side oriented stripes are described, for example, in U.S. Pat. No. 4,435,141 (Weisner et al.), U.S. Pat. No. 6,159,544 (Liu et al.), U.S. Pat. No. 6,669,887 (Hilston et al.), and U.S. Pat. No. 7,678,316 (Ausen et al.) and Int. Pat. App. Pub. No. WO 2011/119323 (Ausen et al.). Films having multiple segmented flows within a matrix of another polymer are described, for example, in U.S. Pat. No. 5,773,374 (Wood et al.). In some cases, some of the stripes are elastic, and the resulting film is elastic in at least a direction transverse to the stripes.

SUMMARY

The present disclosure provides a laminate of a fibrous web and a film having alternating first and second regions, where the second regions are more elastic than the first regions. The laminate is generally designed to maximize the elastic potential (that is, extension and recovery) of the elastic second regions of the film.

In one aspect, the present disclosure provides an incrementally activated laminate that includes an incrementally activated fibrous web and a film with alternating first and second regions. The first regions include a first polymeric composition. The second regions include an elastic polymeric composition that is more elastic than the first polymeric composition. The first polymeric composition may be considered inelastic in some embodiments. A distance between midpoints of two first regions separated by one second region is smaller than the pitch of the activation of the fibrous web, and the first regions are not plastically deformed.

In another aspect, the present disclosure provides an extensible laminate that includes an extensible fibrous web and a film with alternating first and second regions laminated to the extensible fibrous web. The first regions include a first polymeric composition, and the second regions include an elastic polymeric composition that is more elastic than the first polymeric composition. A tensile elongation at maximum load of the film is up to 250 percent of the tensile elongation at maximum load of the extensible fibrous web.

Methods of making laminates are also disclosed. In another aspect, the present disclosure provides a method of making an incrementally stretched laminate. The method includes laminating a fibrous web and a film with alternating first and second regions to form a laminate and passing the laminate between intermeshing surfaces to provide an incrementally stretched laminate. The first regions include a first polymeric composition, and the second regions include an elastic polymeric composition that is more elastic than the first polymeric composition. A distance between midpoints of two first regions separated by one second region is smaller than the pitch of one of the intermeshing surfaces, and the first regions are not plastically deformed.

In another aspect, the present disclosure provides a method of making an extensible laminate. The method includes laminating an extensible fibrous web and a film comprising alternating first and second regions to form an extensible laminate. The first regions include a first polymeric composition, and the second regions include an elastic polymeric composition that is more elastic than the first polymeric composition. The extensible fibrous web and the film are selected such that a tensile elongation at maximum load of the film is up to 250 percent of the tensile elongation at maximum load of the extensible fibrous web.

The laminates according to and/or made according to the present disclosure include a film having a significant amount of material that is relatively inelastic in combination with elastic material. For example, in some embodiments of any of the aforementioned aspects, the first regions make up a higher volume percentage than the second regions of the film. However, the films still have useful elongations when stretched in a direction transverse to the direction in which the alternating first and second regions extend. Therefore, in the films included in the laminates according to the present disclosure, relatively expensive elastic materials are used efficiently, and the laminates disclosed herein can be lower in cost than other elastic laminates, which typically include higher amounts of elastic materials.

Laminates according to and/or made according to the present disclosure are typically reliable and aesthetically appealing. In embodiments of incrementally stretched laminates according to or made according to the present disclosure, in which a distance between midpoints of two first regions separated by one second region is smaller than the pitch of the activation of the fibrous web, the first regions are advantageously not plastically deformed. Plastic deformation can lead to breakage or non-uniformity in the laminate and is therefore typically not desirable. In embodiments of extensible laminates according to and/or made according to the present disclosure, a tensile elongation at maximum load of the film is up to 250 percent of the tensile elongation at maximum load of the extensible fibrous web. When the elongation of film does not exceed the tensile elongation of the fibrous web by more than 250 percent, delamination of the extensible fibrous web and the film is less likely to occur than when, for example, the elastic film is much more extensible than the fibrous web.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "alternating" as used herein refers to one first region being disposed between any two adjacent second regions (i.e., the second regions have only one first region between them) and one second region being disposed between any two adjacent first regions.

The term "elastic" refers to any material (such as a film that is 0.002 mm to 0.5 mm thick) that exhibits recovery from stretching or deformation. A material, film, or composition that is more elastic than another material, film, or composition exhibits at least one of higher elongation or lower hysteresis (usually both) than another material, film, or composition. In some embodiments, a material may be considered to be elastic if upon application of a stretching force, it can be stretched to a length that is at least about 25 (in some embodiments, 50) percent of its initial length and can recover at least 40 percent of its elongation upon release of the stretching force.

The term "inelastic" refers to any material (such as a film that is 0.002 mm to 0.5 mm thick) that does not exhibit recovery from stretching or deformation to a large extent. For example, an inelastic material that is stretched to a length that is at least about 50 percent greater than its initial length will recover less than about 40, 25, 20, or 10 percent of its elongation upon release of its stretching force. In some embodiments, an inelastic material may be considered to be a flexible plastic that is capable of undergoing permanent plastic deformation if it is stretched past its reversible stretching region.

"Elongation" in terms of percent refers to {(the extended length–the initial length)/the initial length} multiplied by 100. Unless otherwise defined, when a film or portion thereof is said herein to have an elongation of at least 100 percent, it is meant that the film has an elongation to break of at least 100 percent using the test method described in the Examples, below.

The term "extensible" refers to a material that can be extended or elongated in the direction of an applied stretching force without destroying the structure of the material or material fibers. An extensible material may or may not have recovery properties. For example, an elastic material is an extensible material that has recovery properties. In some embodiments, an extensible material may be stretched to a length that is at least about 5, 10, 15, 20, 25, or 50 percent greater than its relaxed length without destroying the structure of the material or material fibers.

The term "machine direction" (MD) as used above and below denotes the direction of a running, continuous web during the manufacturing of the film disclosed herein. When a portion is cut from the continuous web, the machine direction corresponds to the longitudinal direction of the film. Accordingly, the terms machine direction and longitudinal direction may be used herein interchangeably. The term "cross-direction" (CD) as used above and below denotes the direction that is essentially perpendicular to the machine direction. When a portion of the film disclosed herein is cut from the continuous web, the cross-direction corresponds to the width of the film.

The term "incremental stretching" refers to a process of stretching a fibrous material or a laminate including a fibrous material where the fibrous material or laminate is supported at plural spaced apart locations during elongation of the fibers therebetween, which restricts the elongation to specifically controlled increments of elongation defined by the spacing between support locations.

The terms "first", "second", and "third" are used in this disclosure. It will be understood that, unless otherwise noted, those terms are used in their relative sense only. For these components, the designation of "first", "second", and "third" may be applied to the components merely as a matter of convenience in the description of one or more of the embodiments.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings.

FIGS. 2A through 5A are expanded regions near the dispensing surfaces of exemplary shims shown in FIGS. 2 to 5, respectively;

DETAILED DESCRIPTION

Figure 1A:
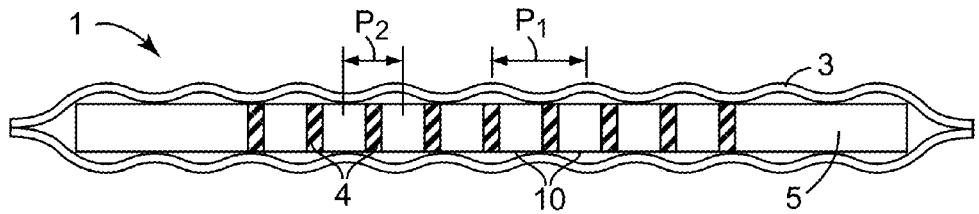
FIG. 1A is an end view of one embodiment of an incrementally activated laminate according to the present disclosure.

Referring now to FIG. 1A, an end view of an incrementally activated laminate according to the present disclosure is shown. The laminate 1 includes an incrementally activated fibrous web 3 and a film 5 with alternating first regions 10 and second regions 4. The distance (p2) between midpoints of two first regions 10 separated by one second region 4 is smaller than the pitch p1 of the activation of the fibrous web. In the embodiment illustrated in FIG. 1A, the first and second regions 10 and 4 are alternating side-by-side stripes of a first polymeric composition and a second polymeric composition, respectively. Although not shown in the end view of FIG. 1A, first regions 10 and second regions 4 typically extend in the machine direction, or longitudinal direction, of the film 5. The second regions 4 include an elastic polymeric composition that is more elastic than a first polymeric composition in the first regions 10. In illustrated laminate 1, the first regions 10 and second regions 4 are each of generally uniform composition. In other words, the first polymeric composition in first regions 10 extends from the top major surface, through the thickness, and to the bottom major surface of the film, and the elastic polymeric composition in second regions 4 extends from the top major surface, through the thickness, and to the bottom major surface of the film. However, in other embodiments, there may be skin layers on one of the top or bottom major surfaces of the film. The skin layers may be formed of the first or elastic polymeric compositions or another, different material, for example.

Figure 1B:
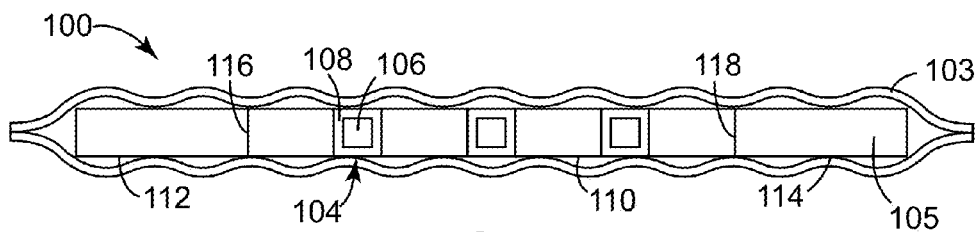
FIG. 1B is an end view of another embodiment of an incrementally activated laminate according to the present disclosure.

Another embodiment of an incrementally activated laminate according to the present disclosure is shown as an end view in FIG. 1B. Like in laminate 1 shown in FIG. 1A, laminate 100 includes a film 105 that has alternating first regions 110 and second regions 104. However, in laminate 100, the second regions 104 are strands comprising a core 106 and a sheath 108, wherein the core is more elastic than the sheath. Optionally, ribbon regions 112 and 114 may be present on one or both edges of the film 105. When ribbon regions 112 and/or 114 are present, weld lines 116 and 118 may or may not be visible. In some embodiments, the ribbon region 112 and/or 114 attached can provide a large, non-stretchable area for laminating the film to the fibrous web or other components of a final article (e.g., an absorbent article) or for holding the laminate along its edges during the stretching process. In some embodiments in which second regions are strands comprising a core and a sheath, ribbon regions 112 and 114 and transition regions 116 and 118 are absent. In many embodiments, first regions 110 comprise the first polymeric composition, cores 106 comprise the elastic polymeric composition, and sheaths 108 comprise a second polymeric composition. However, in some embodiments, both the first regions 110 and the sheaths 108 may have the same polymeric composition. Although not shown in the end view of FIG. 1B, first regions 110 and second regions 104 typically extend in the machine direction, or longitudinal direction, of the film 105. In laminate 100, the first regions 110 are generally of uniform composition. In other words, the first polymeric composition in the first regions 110 extends from the top major surface, through the thickness, and to the bottom major surface of the film. However, in other embodiments, first regions 110 may also have a core/sheath structure.

In laminate 100 shown in FIG. 1B, sheath 108 surrounds core 106. In other words, the sheath 108 extends around the entire outer surface of core 106, which, in the end view of FIG. 1B, is represented by the perimeter of core 106. However, the sheath 108 need not completely surround core 106. In some embodiments, the sheath extends around at least 60, 75, or 80 percent of the outer surface of core 106, which, in the end view of FIG. 1B, is represented by the perimeter of core 106. For example, the sheath 108 may separate core 106 and stripes 110 on either side of core 106 and extend around to partially cover the core 106 at the top and bottom surfaces of film 100 without completely covering the core 106 at the top and bottom surfaces of the film. In many embodiments, the sheath 108 forms part of at least one major surface of the film. The sheath may advantageously be less tacky than the elastic polymeric composition and softer than the first polymeric composition. When the sheath that is softer than the first polymeric composition is exposed on at least one of the major surfaces of the film disclosed herein, the force required to initially stretch the film in the direction transverse to direction in which the first and second regions extend may be less than when elastic strands are totally encompassed within a relatively inelastic matrix.

Figure 1C:
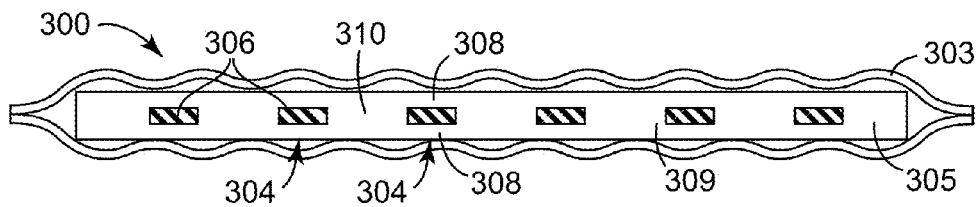
FIG. 1C is an end view of yet another embodiment of an incrementally activated laminate according to the present disclosure.

Another embodiment of an incrementally activated laminate according to the present disclosure is shown as an end view in FIG. 1C. Like in laminates 1 and 100 shown in FIGS. 1A and 1B, laminate 300 includes a film 305 that has alternating first regions 310 and second regions 304. However, in laminate 300, the second regions 304 include strands 306 of the elastic polymeric composition embedded in a matrix 309. The matrix includes skin regions 308 and first regions 310 that are continuous and made from the first polymeric composition. The skin regions 308 are present on either side of the strand 306 and are typically stretched beyond their elastic limit when the laminate is extended in the cross direction CD. Therefore, skin regions 308 typically have a microstructure (not shown) in the form of peak and valley irregularities or folds, the details of which cannot be seen without magnification. Although not shown in the end view of FIG. 1C, first regions 310 and second regions 304 typically extend in the machine direction, or longitudinal direction, of the film 305.

For any of the films 5, 105, and 305, each of the first regions is monolithic (that is, having a generally uniform film composition) and would not be considered fibrous. Also, the sheaths 108 and skin regions 308 would not be considered nonwoven materials. However, in some embodiments described below, portions of the films may be apertured. Generally, the first and second regions are co-extruded and melt bonded together. Furthermore, in any of the embodiments of films disclosed herein, the first and second regions are in the same layer in the thickness direction. That is, the first and second regions may be considered to occupy the same plane, or any imaginary line drawn through the film from one longitudinal edge to the opposite longitudinal edge would touch both the first and second regions. The films themselves are typically extruded as single-layer in the thickness direction although this is not a requirement.

The laminates shown in FIGS. 1A to 1C each have an incrementally activated fibrous web 3, 103, 303. For incrementally activated laminates disclosed herein, the distance between the midpoints between two first regions 10, 110, and 310 separated by one second region 4, 104, and 304 is smaller than the pitch $P_1$ of the activation of the fibrous web. The distance ($P_2$) between midpoints of two first regions separated by one second region is shown in FIG. 1A.

Measuring the distance between midpoints is convenient; however, the distance $P_2$ of the film with alternating first and second regions could also be measured between any point of one first region to a corresponding point in the next first region of the film. The distance between midpoints of successive first regions may or may not be identical. In some embodiments, across a film there is an average of distances between midpoints of two first regions separated by one second region, and for any two given first regions separated by one second region, the distance $P_2$ is within 20 (in some embodiments, 15, 10, or 5) percent of the average of these distances across the film. In some embodiments, the density of the second regions can vary across the web. For example, in some embodiments, it may be desirable to have a higher density of regions toward the center of the film or toward one edge of the film.

Activation pitch $P_1$ of the incrementally activated fibrous web 3, 103, 203 is defined as the distance between the midpoints of two adjacent areas of higher deformation the fibrous web. Pitch $P_1$ can be measured between any point of one area of higher deformation in the fibrous web and the corresponding point in an adjacent area of higher deformation in the fibrous web, but the midpoints may be convenient locations for measuring pitch $P_1$. Areas of higher deformation may be observed as areas of higher breakage, thinning, or higher elongation in the fibrous web. In some embodiments, areas of higher deformation may be observed as areas of a greater degree of shirring of the fibrous web. It should be understood that two adjacent extensible regions of the fibrous web typically have a region of lower deformation between them. In some embodiments, the activation pitch is up to 12 millimeters (mm). In some of these embodiments, the activation pitch is up to 11 mm, 9 mm, 7 mm, 6 mm, 5 mm, or 4 mm. In some embodiments, the activation pitch is at least 1 mm. In some of these embodiments, activation pitch is at least 1.5 mm, 2 mm, or 2.5 mm. In some embodiments, the activation pitch is in a range from 1 mm to 12 mm, 1 mm to 5 mm, or 1 mm to 4 mm.

In some embodiments of the film comprising alternating first and second regions, including any of the embodiments described above, the distance between midpoints of the two first regions separated by one second region is up to 11 millimeters (mm). In some of these embodiments, the distance between midpoints of the two first regions separated by one second region is up to 10 mm, 8 mm, 6 mm, 5 mm, 4 mm, 3 mm, or 2 mm. In some embodiments of the film comprising alternating first and second regions, the distance between midpoints of the two first regions separated by one second region is at least 300 micrometers. In some of these embodiments, the distance between midpoints of the two first regions separated by one second region is at least 350 micrometers, 400 micrometers, 450 micrometers, or 500 micrometers. In some embodiments, the distance between midpoints of the two first regions separated by one second region is in a range from 300 micrometers to 11 mm, 400 micrometers to 5 mm, 400 micrometers to 3 mm, or 500 micrometers to 3 mm.

In some embodiments of the film comprising alternating first and second regions, the second regions have widths up to 4 mm (in some embodiments, up to 3 mm, 2 mm, 1 mm, 750 micrometers, 650 micrometers, 500 micrometers, or 400 micrometers). The width of the second regions is typically at least 100 micrometers (in some embodiments, at least 150 micrometers or 200 micrometers). For example, the second regions may be in a range from 100 micrometers to 4 mm, 150 micrometers to 1 mm, 150 micrometers to 750 micrometers, or 200 micrometers to 600 micrometers wide.

In some embodiments of the film comprising alternating first and second regions, the first regions have widths up to 7 mm (in some embodiments, up to 5 mm, 3 mm, 1 mm, or 750 micrometers). In some embodiments, the first regions are at least 250 micrometers or 500 micrometers wide. For example, the first regions may be in a range from 250 micrometers to 5 mm, 250 micrometers to 2 mm, or 500 micrometers to 1 mm wide. As used herein, the width of the first or second regions is the dimension measured in the cross-direction of the film.

In any of these embodiments where the second region has a core and a sheath, as shown in FIG. 1B, the sheath may have a thickness in a range from 2 micrometers to 20 micrometers, from 3 micrometers to 15 micrometers, or from 5 micrometers to 10 micrometers. As mentioned above, the sheath may not completely surround the core in some embodiments. Sheaths having these dimensions may be useful, for example, to allow facile elongation of the film comprising alternating first and second regions. The thickness of the sheath may be understood to be the distance from the center of the strand to the outer perimeter of the sheath minus the distance from the center of the strand to the inner perimeter of the sheath as measured at the film surface. In some cases, the sheath may be thicker in the interior of the film than at the surface.

Measurements of the widths of the first and second regions may be made, for example, by optical microscopy. Optical microscopy is also useful to determine volume percentage of the first and second regions, for example, in embodiments where the first regions make up a higher volume percentage than the second regions. In some embodiments, the first regions make up a range of about 51% to 85% of the volume of the film, and the second regions make up a range of about 15% to 49% of the volume of the film. In some embodiments, the first regions make up a range of about 55% to 80% of the volume of the film, and the second regions make up a range of about 20% to 45% of the volume of the film.

Films have alternating first and second regions can be made with a variety of basis weights. For example, the basis weight of the film may be in a range from 15 grams per square meter to 100 grams per square meter. In some embodiments, the basis weight of the film is in a range from 20 grams per square meter to 80 grams per square meter. It is useful that in these films, elastomeric polymers can make a relatively low contribution to the basis weight and yet useful elastic properties are achieved in the film. In some embodiments, the elastomeric polymers contribute up to 25, 20, 15, or 10 grams per square meter to the basis weight of the film. In some embodiments, elastomeric polymers contribute in a range from 5 to 10 grams per square meter to the basis weight of the film. The typically low amount of elastomeric polymer in the films provides a cost advantage over elastic films in which elastomeric polymers make a higher contribution to the basis weight of the films.

A variety of film thicknesses may be useful. As used herein, the thickness of the film or any portion thereof is the dimension measured in the "z" direction perpendicular to the machine direction "y" and the cross-direction "x" of the film. In some embodiments, the film may be up to about 250 micrometers, 200 micrometers, 150 micrometers, or 100 micrometers thick. In some embodiments, the film may be at least about 10 micrometers, 25 micrometers, or 50 micrometers thick. For example, the thickness of the film may be in a range from 10 micrometers to 250 micrometers, from 10 micrometers to 150 micrometers, or from 25 micrometers to 100 micrometers thick.

Figure 12:
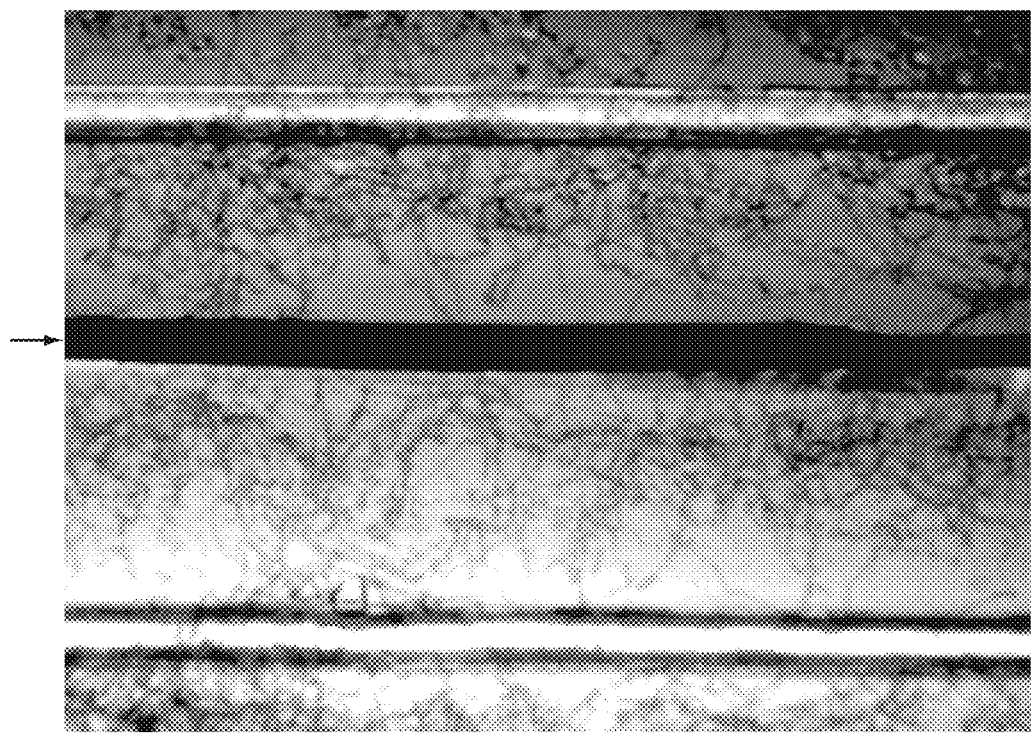
FIG. 12 is a photomicrograph of the laminate made in Illustrative Example 2.

Advantageously, in the incrementally activated laminates according to and/or prepared according to the present disclosure, including in any of the embodiments described above such as those shown in FIGS. 1A, 1B, and 1C, the first regions (10, 110, and 310) are not plastically deformed. As shown in Illustrative Examples 1 to 4, below, plastic deformation of the first regions can occur when the distance between the midpoints of two first regions separated by one second region ($P_2$) is larger than the activation pitch ($P_1$). This can occur in an incremental stretching apparatus, described below, since the first regions can bridge between two peaks on one of the intermeshing surfaces. The plastically deformed regions can appear non-uniform resulting in a less aesthetically pleasing laminate than the incrementally stretched laminate according to and/or made according to the present disclosure. Plastic deformation of the first regions can decrease the percent elongation of the film; therefore, not all of the elastic potential in the film is utilized. Also, plastic deformation typically results in higher permanent set, which can compromise the function of the elastic. Plastic deformation can also lead to breakage in the first regions. Plastic deformation of first regions can be seen in the region referred to by the arrow in photomicrograph of FIG. 12. Some first regions adjacent to the deformed region are not deformed. FIG. 12 illustrates a photomicrograph of Illustrative Example 2, described in the Examples, below. In contrast, in the incrementally activated laminates according to and/or made according to the present disclosure, the position and size of the first and second regions allow the second regions to stretch during incremental stretching of the laminate to take up the activation displacement without plastically deforming the first regions.

The film having alternating first and second regions and the activated fibrous web, which may be extensible or later made extensible by incremental activation, can be laminated together using any one of a variety of lamination techniques (e.g., extrusion lamination), adhesives (e.g., pressure sensitive adhesives), or other bonding methods (e.g., ultrasonic bonding, thermal bonding, compression bonding, or surface bonding). In some embodiments, if a portion of the elastic polymeric composition is exposed at the top or bottom surface of the film and is tacky, the fibrous web may be joined to the exposed elastic polymeric composition. The film and the fibrous web may be substantially continuously bonded or intermittently bonded, for example, before incremental stretching. "Substantially continuously bonded" refers to being bonded without interruption in space or pattern. Substantially continuously bonded laminates can be formed by laminating a fibrous web to a substantially continuous film upon extrusion of the film; passing the film and the fibrous web between a heated smooth surfaced roll nip if at least one of them is thermally bondable; or applying a substantially continuous adhesive coating or spray to one of the film or the fibrous web before bringing it in contact with the other of the film or the fibrous web. "Intermittently bonded" can mean not continuously bonded and refers to the film and the fibrous web being bonded to one another at discrete spaced apart points or being substantially unbonded to one another in discrete, spaced apart areas. Intermittently bonded laminates can be formed, for example, by passing the film and the fibrous web through a heated patterned embossing roll nip if at least one of them is thermally bondable, or by applying discrete, spaced apart areas of adhesive to one of the film or the fibrous web before bringing it into contact with the other of the film or the fibrous web. An intermittently bonded laminate can also be made by feeding an adhesively coated apertured ply or scrim between the film and the fibrous web. For laminates that are substantially continuously bonded, typically there is less bulking of the fibrous web in the final, incrementally stretched laminate. In some embodiments, lamination does not include forming at least the first regions with male fastening elements to attach to the fibrous web. In some embodiments, the first regions are not formed with male fastening elements (e.g., hooks) or may not be formed with surface structure in general.

In some embodiments of laminates disclosed herein and methods of making them, the film having alternating first and second regions can be joined to a fibrous web carrier using surface bonding or loft-retaining bonding techniques. The term "surface-bonded" when referring to the bonding of fibrous materials means that parts of fiber surfaces of at least portions of fibers are melt-bonded to a surface of the film in such a manner as to substantially preserve the original (pre-bonded) shape of the film surface, and to substantially preserve at least some portions of the film surface in an exposed condition, in the surface-bonded area. Quantitatively, surface-bonded fibers may be distinguished from embedded fibers in that at least about 65% of the surface area of the surface-bonded fiber is visible above the film surface in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the film surface bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the film surface bonded thereto. In some of these embodiments, the joining comprises impinging heated gaseous fluid (e.g., ambient air, dehumidified air, nitrogen, an inert gas, or other gas mixture) onto a first surface of the fibrous web carrier while it is moving; impinging heated fluid onto the film surface while the continuous web is moving; and contacting the first surface of the fibrous web with the film surface so that the first surface of the fibrous web is melt-bonded (e.g., surface-bonded or bonded with a loft-retaining bond) to the film surface. Impinging heated gaseous fluid onto the first surface of the fibrous web and impinging heated gaseous fluid on the film surface may be carried out sequentially or simultaneously. Further methods and apparatus for joining a continuous web to a fibrous carrier web using heated gaseous fluid may be found in U.S. Pat. Appl. Pub. Nos. 2011/0151171 (Biegler et al.) and 2011/0147475 (Biegler et al.).

In some embodiments of the laminates according to and/or made according to the present disclosure, including any embodiments of the laminates described above, incremental activation of the laminate can be carried out by incremental stretching. Incremental stretching of the laminate can be carried out in any one of a variety of ways including ring-rolling, structural elastic film processing (SELFing), which may be differential or profiled, in which not all material is strained in the direction of stretching, and other means of incrementally stretching webs as known in the art. Incremental stretching performed in a single direction (for example the cross direction) yields a fibrous web that is uniaxially stretchable. Incremental stretching performed in two directions (for example the machine and cross directions or any two other directions typically maintaining symmetry around the centerline of the fibrous web) yields an outer fibrous web that is biaxially stretchable.

An example of a suitable incremental activation process is the ring-rolling process, described in U.S. Pat. No. 5,366,782 (Curro). Specifically, a ring-rolling apparatus includes opposing rolls having intermeshing teeth that incrementally stretch and can plastically deform the fibrous web (or a portion thereof), rendering the fibrous web stretchable in the ring-rolled regions. In the method of making a laminate disclosed herein, these opposing rolls can be considered to be corrugated rolls that provide the intermeshing surfaces through which the laminate is passed. In other embodiments, the intermeshing surfaces are intermeshing discs, which may be mounted, for example, at spaced apart locations along a shaft as shown, for example, in U.S. Pat. No. 4,087,226 (Mercer). The intermeshing surfaces can also include rotating discs that intermesh with a stationary, grooved shoe.

In the method of making a laminate according to the present disclosure, passing the previously laminated film and fibrous web between intermeshing surfaces provides an incrementally stretched laminate, wherein the pitch of the intermeshing surfaces is larger than the distance between midpoints of two first regions separated by one second region of the film in any of its embodiments described above or below. The pitch of the intermeshing surfaces is defined as the distance between two peaks of one of the intermeshing surfaces separated by one valley. The peaks can be defined as the apexes of outward pointing ridges of the corrugated rolls when such apparatuses are used. The peaks can also be defined as the peripheral surfaces (or center portion thereof) of discs used for incremental stretching. In other incremental stretching apparatuses, the peaks of one of the intermeshing surfaces would be readily identifiable to a person skilled in the art. The pitch of the intermeshing surfaces is typically equivalent to the pitch of the activation described above.

The fibrous web may comprise a variety of suitable materials including woven webs, non-woven webs (e.g., spunbond webs, spunlaced webs, airlaid webs, meltblown web, and bonded carded webs), textiles, nets, knit materials, and combinations thereof. In some embodiments, the fibrous web is a nonwoven web. The term "nonwoven" when referring to a carrier or web means having a structure of individual fibers or threads which are interlaid, but not in an identifiable manner as in a knitted fabric. Nonwoven webs can be formed from various processes such as meltblowing processes, spunbonding processes, spunlacing processes, and bonded carded web processes. In some embodiments, the fibrous web comprises multiple layers of nonwoven materials with, for example, at least one layer of a meltblown nonwoven and at least one layer of a spunbonded nonwoven, or any other suitable combination of nonwoven materials. For example, the fibrous web may be a spunbond-meltbond-spunbond, spunbond-spunbond, or spunbond-spunbond-spunbond multilayer material.

Fibrous webs that provide laminates according to and/or made according to the present disclosure may be made of natural fibers (e.g., wood or cotton fibers), synthetic fibers (e.g., thermoplastic fibers), or a combination of natural and synthetic fibers. Exemplary materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material.

Useful fibrous webs may have any suitable basis weight or thickness that is desired for a particular application. For example, the basis weight of the fibrous web may range from at least about 5, 8, 10, 20, 30, or 40 grams per square meter, up to about 400, 200, or 100 grams per square meter. The fibrous web may be up to about 5 mm, about 2 mm, or about 1 mm in thickness and/or at least about 0.1, about 0.2, or about 0.5 mm in thickness.

Films comprising alternating first and second regions useful for practicing the present disclosure can be made in a variety of ways. For example, a film 5 such as that shown in FIG. 1A can be made by side-by-side co-extrusion using any one of a number of useful methods. For example, U.S. Pat. No. 4,435,141 (Weisner et al.) describes a die with die bars for making a multi-component film having alternating segments in the film cross-direction. A die bar, or bars, at the exit region of the die segments two polymer flows using channels formed on the two outer faces of the die bar. The two sets of segmented polymer flows within these channels converge at a tip of the die bar where the two die bar faces meet. The segmented polymer flows are arranged so that when the two segmented polymer flows converge at the bar tip they form films that have alternating side-by-side zones of polymers. A similar process that further includes co-extruding a continuous outer skin layer on one or both outer faces of the side-by-side co-extruded film as described in U.S. Pat. No. 6,669,887 (Hilston et al.) may also be useful.

In some embodiments, management of the flow of different polymer compositions into side-by-side lanes to form a film such as film 5 can be carried out using a single manifold die with a distribution plate such as that described in, for example, in International Patent Application Publication No. WO 2011/097436 (Gorman et al.), incorporated by reference herein in its entirety. In some of these embodiments, the die comprises a first die cavity in a first die portion, a second die cavity in a second die portion, a distribution plate interposed between at least a portion (e.g., most or all) of the first die cavity and at least a portion (e.g., most or all) of the second die cavity. The distribution plate has a first side forming a boundary of the first die cavity, a second side forming a boundary of the second die cavity, a dispensing edge, a plurality of first extrusion channels, and a plurality of second extrusion channels. The first extrusion channels extend from entrance openings at the first die cavity to exit openings on the dispensing edge, and the second extrusion channels extend from entrance openings at the second die cavity to exit openings on the dispensing edge. The exit openings of the first extrusion channels and the exit openings of the second extrusion channels are disposed in alternating positions along the dispensing edge. Each of the first extrusion channels comprises two opposite side walls and a joining surface connecting the two opposite side walls, and the joining surface of at least some of the first extrusion channels is typically substantially parallel to the first side of the distribution plate.

Films comprising alternating first and second regions useful for practicing the present disclosure such as film 5 shown in FIG. 1A can also be made by other extrusion dies that comprise a plurality of shims and have two cavities for molten polymer, such as those dies described, for example, in Int. Pat. App. Pub. No. WO 2011/119323 (Ausen et al.), incorporated herein by reference in its entirety. The plurality of shims positioned adjacent to one another together define first cavity, a second cavity, and a die slot, wherein the die slot has a distal opening wherein each of the plurality of shims defines a portion of the distal opening. At least a first one of the shims provides a passageway between the first cavity and the die slot, and at least a second one of the shims provides a passageway between the second cavity and the die slot. Typically, at least one of the shims is a spacer shim providing no conduit between either the first or the second cavity and the die slot.

Other side-by-side coextrusion techniques that may be useful for providing a film 5 such as that shown in FIG. 1A include those described in U.S. Pat. No. 6,159,544 (Liu et al.) and U.S. Pat. No. 7,678,316 (Ausen et al.) and Int. Pat. App. Pub. No. WO 2011/119323 (Ausen et al.).

Films comprising alternating first and second regions useful for practicing the present disclosure include films wherein the second regions are strands comprising a core and a sheath, wherein the core is more elastic than the sheath such as film 105 shown in FIG. 1B. Film 105 can be conveniently prepared by extrusion from a die having a variety of passageways from cavities within the die to a dispensing slot. The die may conveniently be comprised of a plurality of shims. In some embodiments, the plurality of shims comprises a plurality of sequences of shims that includes shims that provide a passageway between a first and second cavity and the dispensing slot. In some of these embodiments, there will be additional shims that provide a passageway between the first and/or the second cavity, and/or a third (or more) cavity and the dispensing slot. In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used. For a first example, an eight-shim sequence that when properly provided with molten polymer forms a segment of film of a single-material alternating with a core/sheath strand is described below in connection with FIG. 6.

The shape of the passageways within, for example, a sequence of shims, may be identical or different. Examples of passageway cross-sectional shapes include round, square, and rectangular shapes. In some embodiments, the shims that provide a passageway between one cavity and the dispensing slot might have a flow restriction compared to the shims that provide a passageway between another cavity and the dispensing slot. The width of the distal opening within, for example, a sequence of shims, may be identical or different. For example, the portion of the distal opening provided by the shims that provide a passageway between one cavity and the dispensing slot could be narrower than the portion of the distal opening provided by the shims that provide a passageway between another cavity and the dispensing slot.

In some embodiments, extrusion dies useful for preparing a film such as film 105 include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one or more of the cavities. In some embodiments, the assembled shims (conveniently bolted between the end blocks) further comprise a manifold body for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of the first, second, and third cavities), and such that the expansion seal allows a conduit between the manifold and the cavity.

In some embodiments, the shims useful in a die for preparing a film useful for practicing the present disclosure, wherein the second regions are strands comprising a core and a sheath, have thicknesses in the range from 50 micrometers to 125 micrometers. Typically, the fluid passageways have thicknesses in a range from 50 micrometers to 750 micrometers, and heights less than 5 mm (with generally a preference for smaller heights for decreasingly smaller passageway thicknesses), although thicknesses and heights outside of these ranges may also be useful. In some embodiments, the fluid passageways can have heights in a range from 10 micrometers to 1.5 millimeters. For fluid passageways with large thicknesses or diameters, several smaller thickness shims may be stacked together, or single shims of the desired passageway width may be used. The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the dispensing slot, as misalignment can lead to strands extruding at an angle out of the die which may inhibit bonding between the stripes and the strands. To aid in alignment, an indexing groove can be cut into the shims to receive a key. Also, a vibrating table can be useful to provide a smooth surface alignment of the extrusion tip.

The size of the first and second regions can be adjusted, for example, by the composition of the extruded polymers (e.g., materials, melt viscosities, additives, and molecular weight), pressure in the cavities, flow rate of the polymer stream, and/or the dimensions of the passageways.

Dies useful for preparing film 105 as in the embodiment shown in FIG. 1B have a subsequence of shims in which a core/sheath strand is formed. This core/sheath strand is bonded to a first region (e.g., in the form of a stripe) on one or both sides. As will be discussed with more particularity below in connection with FIG. 6, such dies can include a plurality of shims comprising a plurality of sequences of shims. Such sequences can include shims that provide a third fluid passageway between the third cavity and the dispensing slot, shims that provide at least two second passageways extending from the second cavity to the dispensing slot, wherein each of the two second passageways are on opposite longitudinal sides of the third passageway, and each of the two second passageways has a dimension larger than the third passageway at the point where the third passageway enters the dispensing slot. This allows the flows of the sheath polymeric composition from the second passageways to encapsulate the core polymeric composition entering the dispensing slot from the third passageway. Obtaining good encapsulation of the core polymeric composition entering from the third passageway depends in part on the melt viscosity of the polymeric composition that forms the sheath. In general, lower melt viscosity of the sheath-forming polymeric composition improves the encapsulation of the core. Further, the encapsulation depends in part on the degree to which the at least two second passageways have a dimension larger than the third passageway at the point when they enter the dispensing slot. In general, increasing the degree by which that dimension is larger in the second passageways relative to same dimension in the third passageway will improve the encapsulation of the core. Good results may be obtained when the dimensions of the passageways and pressures within the cavities are manipulated so that the flow speeds of the sheath polymeric composition and the core polymeric composition within the dispensing slot are close to one another.

Extruded films having first and second regions, wherein the second regions are strands comprising a core and a sheath, may be solidified following extrusion by cooling. This can be conveniently accomplished by, for example, quenching the extruded film on a chilled surface (e.g., a chilled roll). In some embodiments, it is desirable to maximize the time to quenching to increase the weld line strength.

Figure 2:
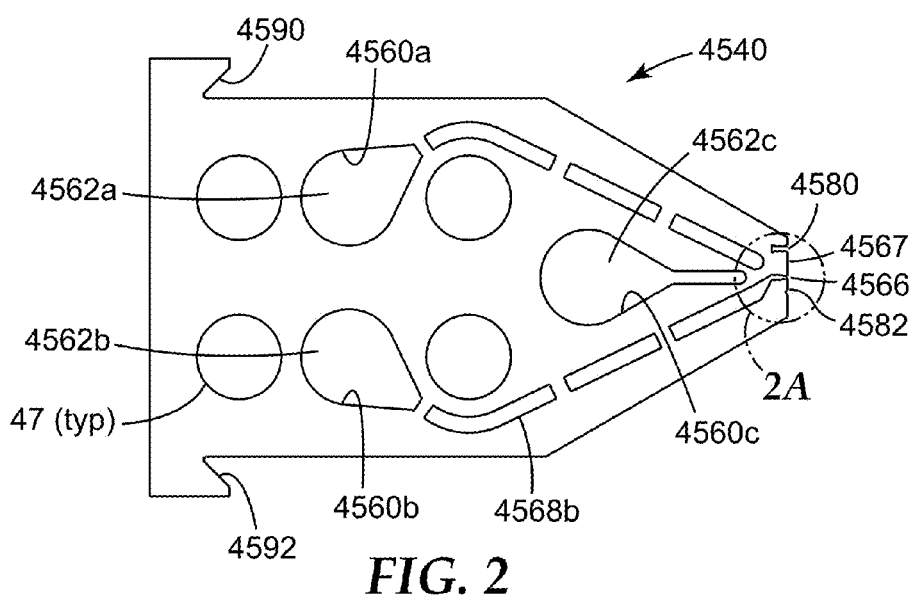
FIG. 2 is a plan view of an exemplary shim suited to form a sequence of shims capable of forming a film including stripes in an alternating arrangement with strands having a sheath/core construction as shown in the embodiment of FIG. 1B.
Figure 3:
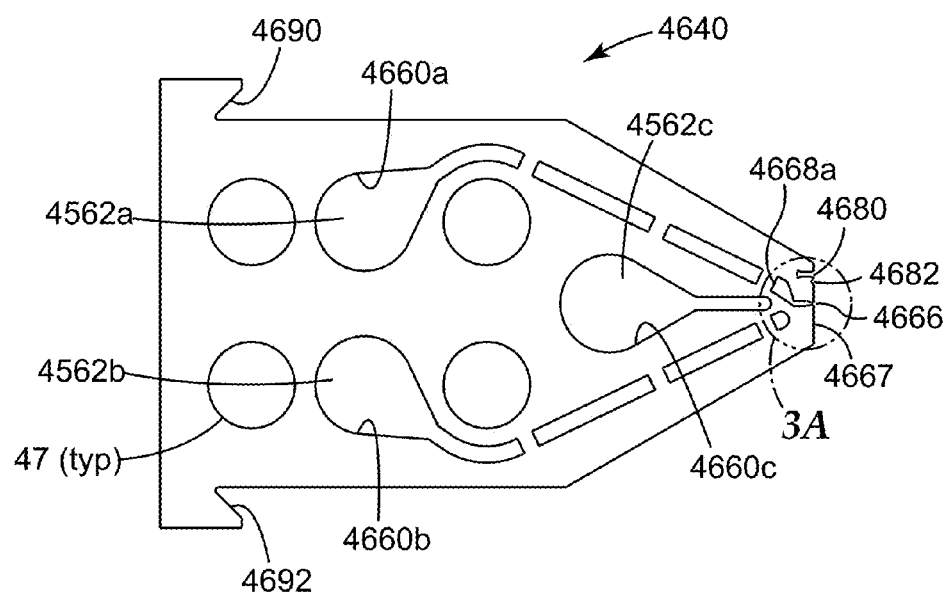
FIG. 3 is a plan view of another exemplary shim suited to form a sequence of shims capable of forming a film including stripes in an alternating arrangement with strands having a sheath/core construction as shown in the embodiment of FIG. 1B.
Figure 4:
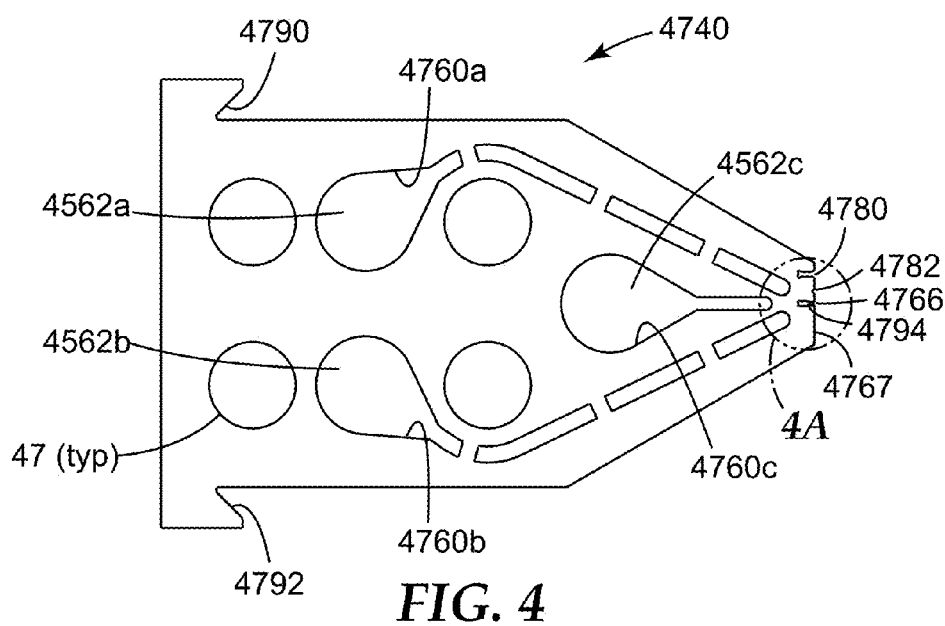
FIG. 4 is a plan view of yet another exemplary shim suited to form a sequence of shims capable of forming a film including stripes in an alternating arrangement with strands having a sheath/core construction as shown in the embodiment of FIG. 1B.
Figure 5:
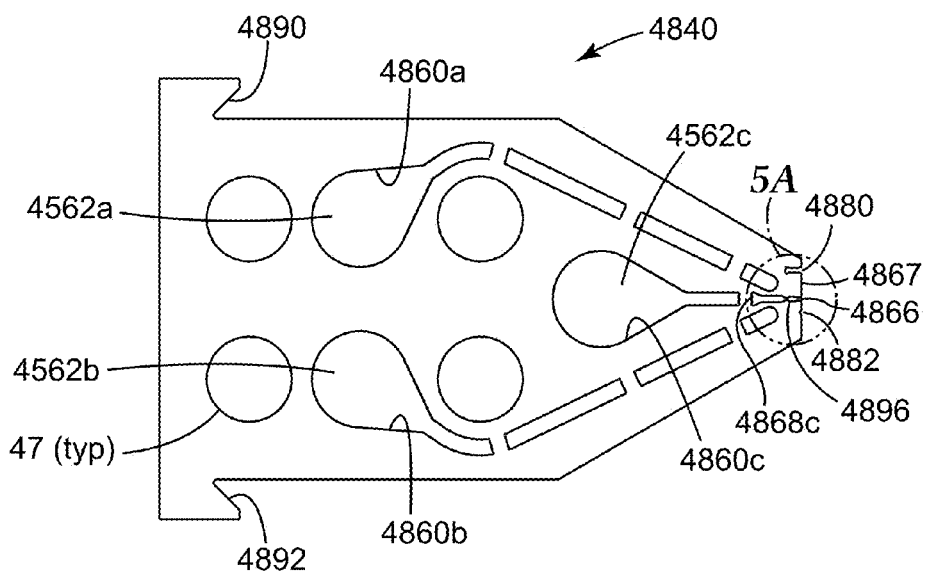
FIG. 5 is a plan view of yet another exemplary shim suited to form a sequence of shims capable of forming a film including stripes in an alternating arrangement with strands having a sheath/core construction as shown in the embodiment of FIG. 1B.

Referring now to FIG. 2, a plan view of shim 4540 is illustrated. Shim 4540 is useful in a plurality of sequences of shims shown in FIGS. 6 to 8, which are for making films having first and second regions, wherein the second regions are strands comprising a core and a sheath. Other shims useful in these sequences are shown in FIGS. 3 to 5. Shim 4540 has first aperture, 4560a, second aperture 4560b, and third aperture 4560c. When shim 4540 is assembled with others as shown in FIG. 9, aperture 4560a will help define second cavity 4562a, aperture 4560b will help define first cavity 4562b, and aperture 4560c will help define third cavity 4562c. As will be discussed with more particularity below, molten polymer in cavities 4562a and 4562c can be extruded in a strand with a sheath/core arrangement, and molten polymer in cavity 4562b can be extruded as a stripe between those sheath/core strands.

Figure 2A:
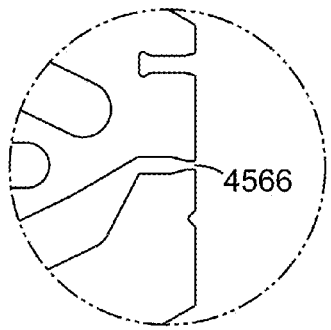
Figure 6:
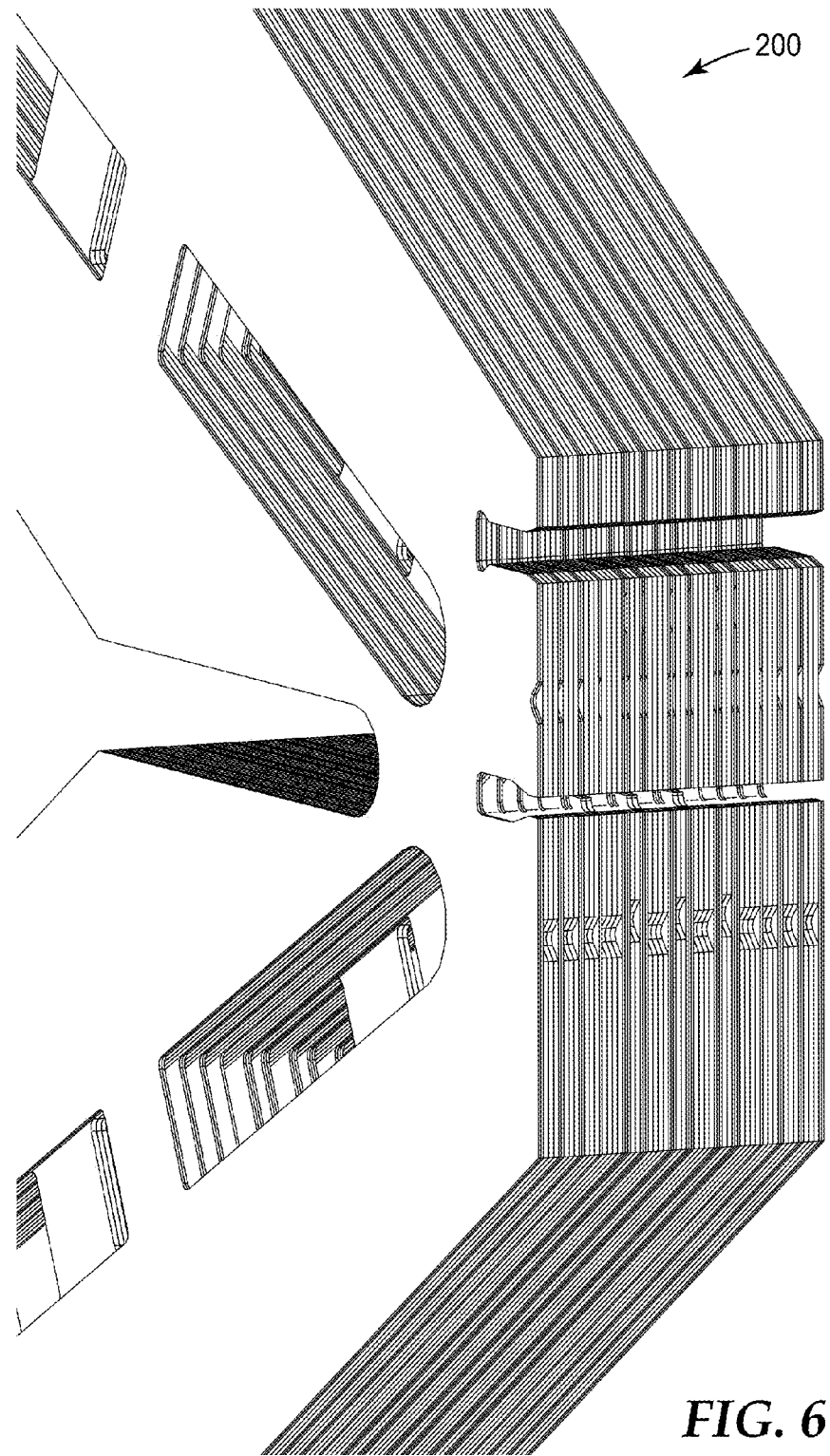
FIG. 6 is a perspective assembly drawing of several different sequences of shims employing the shims of FIGS. 2-5 so as to be able to produce the film including stripes in an alternating arrangement with strands having a sheath/core construction as shown in the embodiment of FIG. 1B.

Shim 4540 has several holes 47 to allow the passage of, for example, bolts to hold shim 4540 and others to be described below into an assembly. Shim 4540 has dispensing opening 4566 in dispensing surface 4567. Dispensing opening 4566 may be more clearly seen in the expanded view shown in FIG. 2A. It might seem that there is no path from cavity 4562b to dispensing opening 4566, via, for example, passageway 4568b, but the flow has a route in the perpendicular-to-the-plane-of-the-drawing dimension when the sequence of FIG. 6 is completely assembled. In the illustrated embodiment, dispensing surface 4567 has indexing groove 4580 which can receive an appropriately shaped key to facilitate assembling diverse shims into a die. The shim may also have identification notch 4582 to help verify that the die has been assembled in the desired manner. This embodiment of the shim has shoulders 4590 and 4592, which can assist in mounting the assembled die in a manner which will be made clear below in connection with FIG. 9.

Figure 3A:
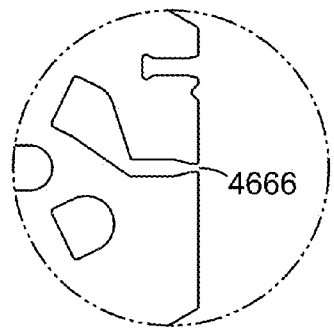

Referring now to FIG. 3, a plan view of shim 4640 is illustrated. Shim 4640 has first aperture 4660a, second aperture 4660b, and third aperture 4660c. When shim 4640 is assembled with others as shown in FIG. 9, aperture 4660a will help define second cavity 4562a, aperture 4660b will help define first cavity 4562b, and aperture 4660c will help define third cavity 4562c. Analogous to shim 4540, shim 4640 has dispensing surface 4667, and in this particular embodiment, dispensing surface 4667 has indexing groove 4680 and an identification notch 4682. Also analogous to shim 4540, shim 4640 shoulders 4690 and 4692. It might seem that there is no path from cavity 4562a to dispensing orifice 4666, via, for example, passageway 4668a, but the flow has a route in the perpendicular-to-the-plane-of-the-drawing dimension when the sequence of FIG. 6 is completely assembled. Dispensing opening 4666 may be more clearly seen in the expanded view shown in FIG. 3A.

Figure 4A:
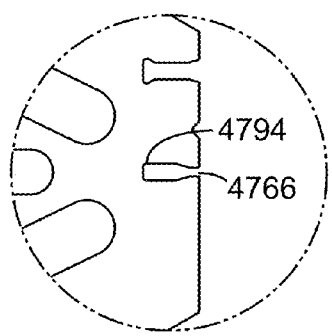

Referring now to FIG. 4, a plan view of shim 4740 is illustrated. Shim 4740 has first aperture 4760a, second aperture 4760b, and third aperture 4760c. When shim 4740 is assembled with others as shown in FIG. 9, aperture 4760a will help define second cavity 4562a, aperture 4760b will help define first cavity 4562b, and aperture 4760c will help define third cavity 4562c. Analogous to shim 4540, shim 4740 has dispensing surface 4767, and in this particular embodiment, dispensing surface 4767 has indexing groove 4780 and identification notch 4782. Also analogous to shim 4540, shim 4740 has shoulders 4790 and 4792. Shim 4740 has dispensing opening 4766, but it will be noted that this shim has no connection between dispensing opening 4766 and any of the cavities 4562a, 4562b, or 4562c. As will be appreciated more completely in the discussion below, in some of the positions where shim 4740 appears, blind recess 4794 behind dispensing orifice 4766 helps shape the flow of material from cavity 4562a into a sheath around the core provided by second polymeric composition emerging from shim 4840. Blind recess 4794 and dispensing orifice 4766 may be more clearly seen in the expanded view shown in FIG. 4A. In other positions where shim 4740 appears, it serves to manipulate the resistance of the dispensing slot within a region to extruded flow. This will also be discussed in more detail below.

Figure 5A:
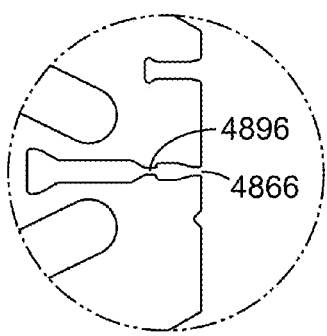

Referring now to FIG. 5, a plan view of shim 4840 is illustrated. Shim 4840 has first aperture, 4860a, second aperture 4860b, and third aperture 4860c. When shim 4840 is assembled with others as shown in FIG. 9, aperture 4860a will help define second cavity 4562a, aperture 4860b will help define first cavity 4562b, and aperture 4860c will help define third cavity 4562c. Analogous to shim 4540, shim 4840 has dispensing surface 4867, and in this particular embodiment, dispensing surface 4867 has indexing groove 4880 and identification notch 4882. Also analogous to shim 4540, shim 4840 has shoulders 4890 and 4892. It might seem that there is no path from cavity 4562c to dispensing orifice 4866, via, for example, passageway 4868c, but the flow has a route in the perpendicular-to-the-plane-of-the-drawing dimension when the sequence of FIG. 6 is completely assembled. It will be noted that passageway 4868c includes constriction 4896 upstream from dispensing orifice 4866, which may be more clearly seen in the expanded view of FIG. 5A. It will be appreciated in connection with FIG. 8 that constriction 4896 helps the sheath to completely surround the core of the emerging strand.

Figure 7:
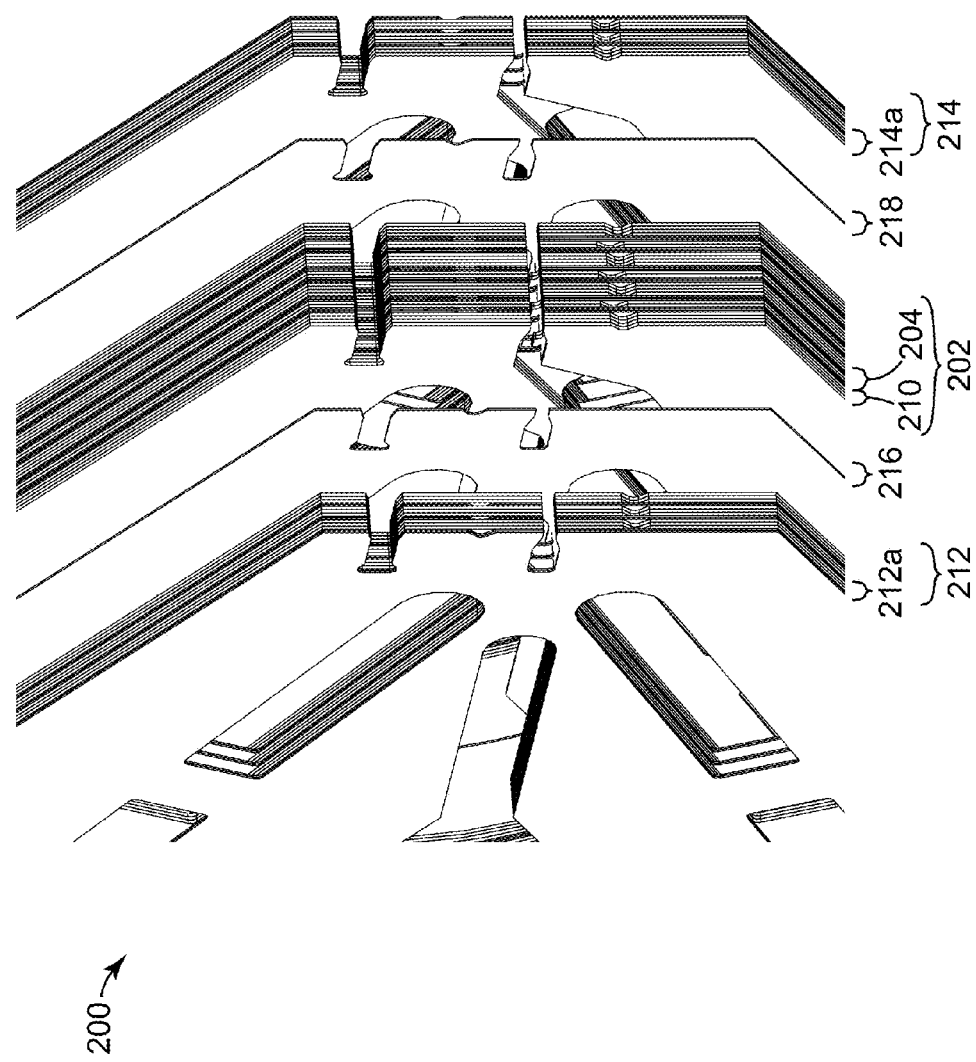
FIG. 7 is a partially exploded perspective view where the several different sequences of shims shown together in FIG. 6 are shown separated into the sequences that produce the several regions discussed in connection with the film portion of FIG. 1B.

Referring now to FIG. 6, a perspective assembly drawing of a several different repeating sequences of shims, collectively 200, employing the shims of FIGS. 2-5 so as to be able to produce a film having first and second regions, wherein the second regions are strands comprising a core and a sheath, is shown. It should be noted in FIG. 6 that the dispensing slot, formed by the dispensing openings 4566, 4666, 4766, and 4866 collectively in the plurality of shims, is a continuous opening across the die. There are no shims without dispensing openings, which would form breaks to cause the extruded polymeric compositions to form into separated strands. Referring now to FIG. 7, the several different repeating sequences of shims shown together in FIG. 6 are shown separated into the sequences that produce the several regions discussed above in connection with FIG. 1B. More particularly, and proceeding left to right, die zone 212 comprises three instances of a repeating sequence of four shims 212a that can extrude ribbon region 112. Die zone 216 includes one instance of one shim. Die zone 202 includes four instances of a repeating sequence of four shims 210 that can extrude stripes 110 making up the first regions. Interspersed with repeating sequences of four shims 210 are three instances of a repeating sequence 204 of eight shims that can extrude strands 104. Die zone 218 includes one instance of one shim. Finally die zone 214 comprises three instances of a repeating sequence of four shims 214a that can extrude ribbon region 114. Die zones 212, 216, 218, and 214 and consequently ribbon regions 112 and 114 and weld lines 116 and 118 are optional in the embodiments where second regions are strands comprising a core and a sheath.

Figure 8:
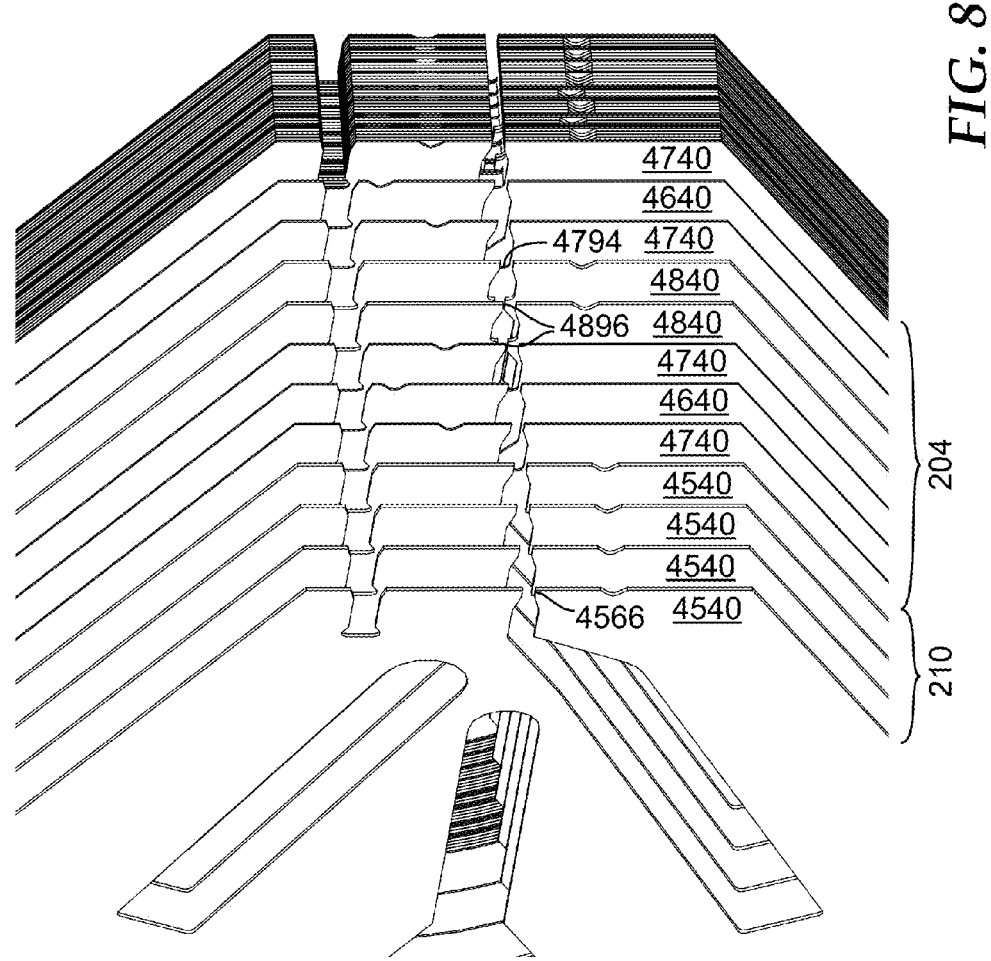
FIG. 8 is a perspective view of the some of the sequence of shims of FIG. 7, further exploded to reveal some individual shims.
Figure 9:
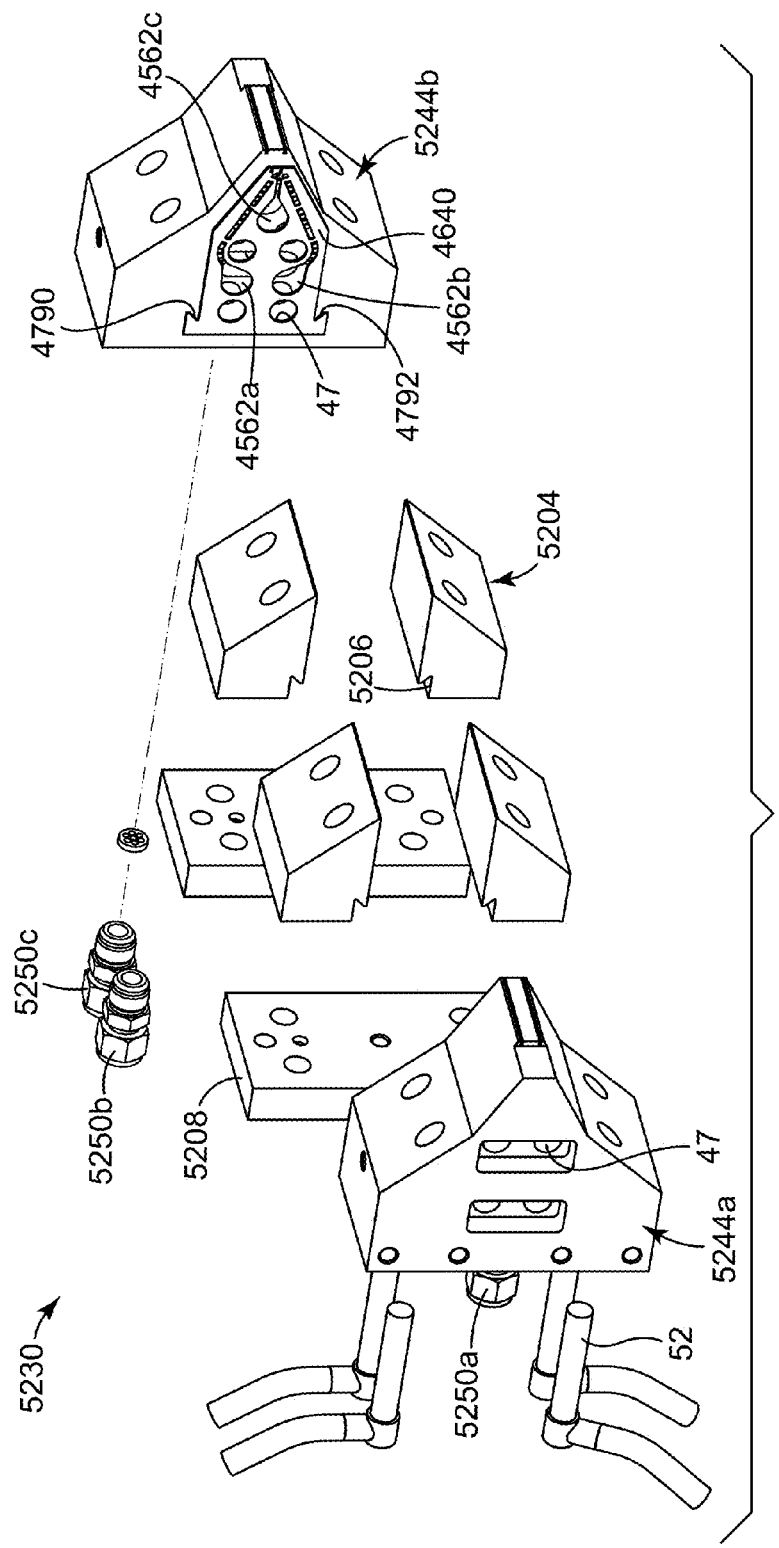
FIG. 9 is an exploded perspective view of an exemplary mount suitable for an extrusion die composed of multiple repeats of the sequence of shims of FIG. 6.

Referring now to FIG. 8, a perspective view of die zones 210 and 204 of FIG. 7 is further exploded to reveal some individual shims. More particularly, die zone 210 is more clearly shown to comprise four instances of shim 4540. Further, die zone 204 is more clearly shown to comprise one instance of shim 4740, one instance of shim 4640, one instance of shim 4740, two instances of shim 4840, one instance of shim 4740, one instance of shim 4640, and one instance of shim 4740, making eight shims total. In this view, it is easier to appreciate how the strand 104 (seen in FIG. 1B) is formed. Referring again to FIG. 5, the presence of constriction 4896 on the two instances of shim 4840 allows the inflows along passageways 4668a to have a dimension larger than passageway 4868c at the point where passageway 4868c enters the dispensing slot. Referring again to FIGS. 3 and 4, blind recesses 4794 on the two instances of shim 4740 cooperate to allow the inflows from along passages 4668a on the two instances of shim 4640 to envelop the inflow from the passages 4868c on the two instances of shim 4840, resulting in an strand 104 with sheath 108 around core 106 (seen in FIG. 1B). The strand 104, which includes relatively elastic core 106, is bonded to a relatively less elastic first region in the form of stripe 110 (seen in FIG. 1B), which emerges from dispensing openings 4566 in the four instances of shim 4540.

Referring now to FIG. 9, an exploded perspective view of a mount 5230 suitable for an extrusion die composed of multiple repeats of the sequence of shims of FIG. 6 is illustrated. Mount 5230 is particularly adapted to use shims 4540, 4640, 4740 and 4840 as shown in FIGS. 2 through 8. However for visual clarity, only a single instance of shim 4640 is shown in FIG. 9. The multiple repeats of the sequence of shims of FIG. 6 are compressed between two end blocks 5244a and 5244b. Conveniently, through bolts can be used to assemble the shims to the end blocks 5244a and 5244b, passing through holes 47 in shims 4540, 4640, 4670, and 4680.

In this embodiment, inlet fittings 5250a, 5250b, and 5250c provide a flow path for three streams of molten polymer through end blocks 5244a and 5244b to cavities 4562a, 4562b, and 4562c. Compression blocks 5204 have a notch 5206 that conveniently engages the shoulders on the shims (e.g., 4690 and 4692 on 4640). When mount 5230 is completely assembled, compression blocks 5204 are attached by, e.g. machine bolts to backplates 5208. Holes are conveniently provided in the assembly for the insertion of cartridge heaters 52.

Figure 10:
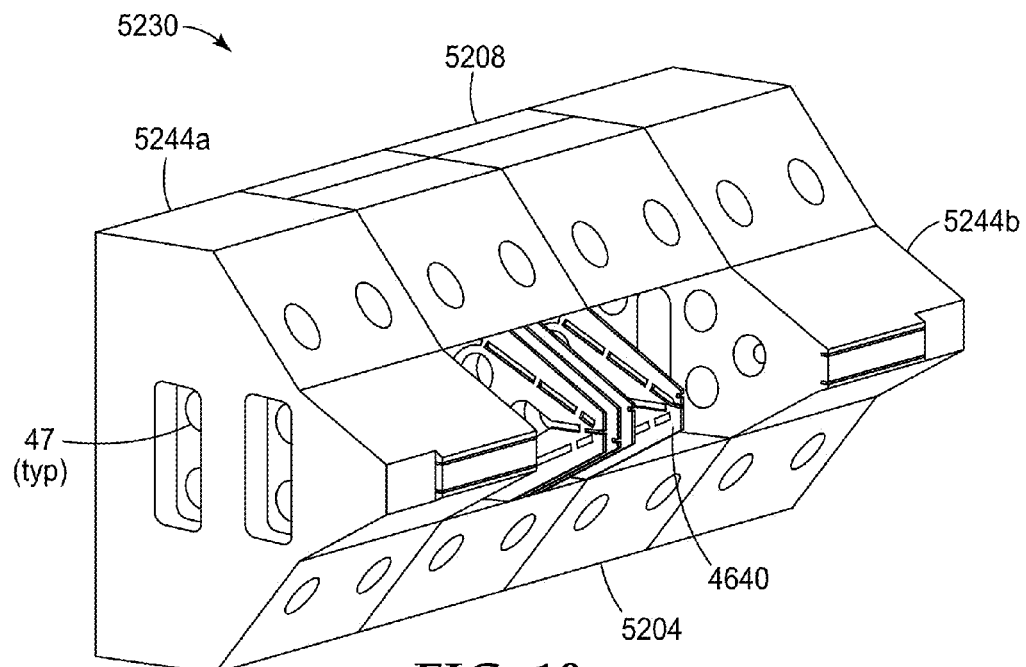
FIG. 10 is a perspective view of the mount of FIG. 9 in an assembled state.

Referring now to FIG. 10, a perspective view of mount 5230 of FIG. 9 is illustrated in a partially assembled state. A few shims (e.g., 4640) are in their assembled positions to show how they fit within mount 5230, but most of the shims that would make up an assembled die have been omitted for visual clarity.

While each of FIGS. 2 to 10 illustrate an apparatus for extrusion that includes a plurality of shims, it is also envisioned that an extrusion die could be machined to have the same first, second, and third passageways from first, second, and third cavities without using a plurality of shims. The passageways may be machined into various regions of a die or into blocks, for example, that can be assembled to make a die. Such blocks can have thicknesses of up to about 5 centimeters or more. Any of these constructions may be useful for making films having first and second regions, wherein the second regions are strands comprising a core and a sheath, such as film 105 shown in FIG. 1B.

The extrusion die described above in connection with FIGS. 2 to 10 may also be useful for making a variety of film constructions including, for example, three or more different polymeric compositions. In some embodiments, the stripes are made from the first polymeric composition, the sheath is made from a second polymeric composition, and the core is made from the elastic polymeric composition that is more elastic than either the first or second polymeric composition. In embodiments of the film or method disclosed herein that include a first polymeric composition, a second polymeric composition, and an elastic polymeric composition, blending may be useful for making a second polymeric composition that is relatively more elastic than the first polymeric composition but relatively less elastic than the elastic polymeric composition from which the cores are made. In some embodiments, the second polymeric composition comprises a blend of the first polymeric composition and the elastic polymeric composition. In these embodiments, the second polymeric composition generally has good compatibility with and good adhesion to both the first polymeric composition and the elastic polymeric composition. This allows the second polymeric composition to serve as an effective tie layer between the stripes and the strand cores without the use of other compatibilizers such as those described in U.S. Pat. No. 6,669,887 (Hilston et al.). However, in some embodiments, compatibilizers added to at least one of the second or third polymeric compositions may be useful. Examples of useful compatibilizers can be found in U.S. Pat. No. 4,787,897 (Torimae et al.) and U.S. Pat. No. 6,669,887 (Hilston et al.). The polymeric composition for making the sheath, for example, when it is different from the first polymeric composition, may be selected such that a film (e.g., 0.002 mm to 0.5 mm thick) of the sheath polymeric composition, which may be a blend of polymers, has an elongation of at least 5% at room temperature.

The extrusion die described above in connection with FIGS. 2 to 10 is also useful, for example, for making film constructions including two different polymeric compositions. In some embodiments, the same polymeric composition may be in two different cavities. For example, in the apparatus illustrated in FIGS. 2 to 10, the same polymeric composition may be used in both cavities 4562a and 4562b to provide a film in which the cores 106 of strands 104 are made from one polymeric composition and the sheaths 108 of strands 104 and the stripes 110 are made from another polymeric composition. Using this die and method, a film may be made that has stripes of a first polymeric composition alternating with strands of, for example, the elastic polymeric composition, wherein the strands are encapsulated by the first polymeric composition such that the elastic polymeric composition is not exposed on at least one major surface (or both major surfaces) of the film. In these embodiments in which the stripes and the sheath are made from the same polymeric composition, it is typically still possible to detect a boundary between the sheath and the stripes because of the different flow velocities in the flow channels for the stripes and the sheath. The flow velocity for the sheath is typically much lower than that of the stripes because of the smaller size of the flow channels for the sheath (e.g., formed by shims 4640 and 4740 shown in FIG. 8) relative to the flow channels for the stripes (e.g., formed by shims 4540 shown in FIG. 8). The sheath material typically accelerates more at the dispensing opening causing it to have more molecular orientation, and as a result, a higher degree of birefringence as described above, than the stripes. Thus, there is typically a difference in molecular orientation between the sheath and the stripes that can be detected by measuring birefringence. Depending on the length of time the sheath and the stripes are allowed to remain in the molten state after they are merged, a weld line is formed between the sheath and the stripes. A weld line between the sheath and the stripes in the film 105 shown in FIG. 1B is typically visible, for example, when the film is stretched in a direction transverse to the strands and stripes.

For more information regarding films including stripes alternating with strands having a core and a sheat, see co-pending U.S. patent application Ser. No. 13/633,396 (Hanschen et al.), filed on the same day as the present application and incorporated by reference herein in its entirety.

Films comprising alternating first and second regions useful for practicing the present disclosure include films wherein the first regions are made from a first polymeric composition, and wherein the second regions comprises strands of the elastic polymeric composition embedded in a matrix of the first polymeric composition that is continuous with the first regions. An example of these films is shown in FIG. 1C as film 305. To make such films an elastic polymer melt stream can be segmented into multiple substreams and then extruded into the center of a melt stream of the first polymeric composition, which is then formed into a film. This co-extrusion method creates a film that has multiple segmented flows within a matrix of another polymer. Dies useful for making films of this type include inclusion co-extrusion dies (e.g., those shown in U.S. Pat. No. 6,767,492 (Norquist et al.) and U.S. Pat. No. 5,429,856 (Krueger et al.)) and other similar apparatuses.

A variety of polymeric compositions are useful in any of the methods described above for making films comprising alternating first and second regions. The mass flow (or volume flow) of the different polymeric compositions can be equal or unequal as they are respectively extruded. In some embodiments, it is desirable for the melt strengths of the different polymeric compositions to be similar. Polymeric compositions useful for the first and second regions (e.g., including core and sheath regions) may be selected, for example, based on their compatibility and mutual adhesion properties.

In some embodiments, the polymeric compositions that may be extruded to make a film comprising alternating first and second regions are thermoplastic polymeric compositions (e.g., polyolefins (e.g., polypropylene, polypropylene copolymers, polyethylene, and polyethylene copolymers), polyvinyl chloride, polystyrenes and polystyrene block copolymers, nylons, polyesters (e.g., polyethylene terephthalate), polyurethanes, polyacrylates, silicone polymers, and copolymers and blends thereof). However, polymeric materials that can be crosslinked (e.g., by heat or radiation) may also be useful for some embodiments. When a heat curable resin is used, a die described in any of the above methods can be heated to start the cure so as to adjust the viscosity of the polymeric material and/or the pressure in the corresponding die cavity.

The first regions in film comprising alternating first and second regions are typically made from a first polymeric composition. The first polymeric composition can be relatively less elastic than the elastic polymeric composition in the second regions. The first polymeric composition can also be inelastic as defined above. The first polymeric composition can be formed, for example, of semicrystalline or amorphous polymers or blends. Inelastic polymers can be polyolefinic, formed predominantly of polymers such as polyethylene, polyethylene copolymers, polypropylene, polypropylene copolymers, polybutylene, or polyethylene-polypropylene copolymers. In some embodiments, the first polymeric composition comprises polypropylene, polyethylene, polypropylene-polyethylene copolymer, or blends thereof.

In the films comprising alternating first and second regions, second regions comprise an elastic polymeric composition that is more elastic than the first polymeric composition described above. This typically means that the force required to stretch the second regions in the cross-machine direction is less that the force required to stretch the first regions. An elastic polymeric composition may be selected, for example, such that a film of the elastic polymeric composition (such as a film that is 0.002 mm to 0.5 mm thick) has an elongation of at least 200 percent at room temperature. Examples of useful elastic polymeric compositions include thermoplastic elastomers such as ABA block copolymers, polyurethane elastomers, polyolefin elastomers (e.g., metallocene polyolefin elastomers), olefin block copolymers, polyamide elastomers, ethylene vinyl acetate elastomers, and polyester elastomers. An ABA block copolymer elastomer generally is one where the A blocks are polystyrenic, and the B blocks are conjugated dienes (e.g., lower alkylene dienes). The A block is generally formed predominantly of substituted (e.g, alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties.

The elastic polymeric composition can include many types of thermoplastic elastomers that are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E.I. duPont de Nemours and Company, Wilmington, Del., under the trade designation "HYTREL", from ExxonMobil, Irving, Tex. under the trade designation "VISTAMAXX", and more.

The elastic polymeric composition can also include a blend of any of the elastomers described above and any of the polymers described above in the first polymeric composition. Similarly, the first polymeric composition may include a blend of relatively less elastic polymers and relatively more elastic polymers, as long as the elastic polymeric composition is more elastic than the first polymeric composition in the first regions.

In some embodiments, polymeric materials used to make films useful for practicing the present disclosure may comprise a colorant (e.g., pigment and/or dye) for functional (e.g., optical effects) and/or aesthetic purposes (e.g., each has different color/shade). Suitable colorants are those known in the art for use in various polymeric compositions. Examples of colors imparted by the colorant include white, black, red, pink, orange, yellow, green, aqua, purple, and blue. In some embodiments, it is desirable level to have a certain degree of opacity for one or more of the polymeric compositions. The amount of colorant(s) to be used in specific embodiments can be readily determined by those skilled in the art (e.g., to achieve desired color, tone, opacity, transmissivity, etc.). The polymeric compositions such as the first polymeric composition, the elastic polymeric composition, and, in some embodiments, the sheath polymeric composition may be formulated to have the same or different colors. In some embodiments, at least portions of the first and second regions are different colors.

In some embodiments, the first regions include apertures, which may be useful, for example, for increasing the breathability of the film portion of the laminate. Apertures can be made in the first regions of the film by a variety of methods including needle-punching, laser techniques, or other methods to introduce apertures into the film after it is extruded.

In some embodiments of the laminates according to and/or made with a method according to the present disclosure, both surfaces of the film having alternating first and second regions are joined to fibrous webs. In other embodiments, only one side may be joined to a fibrous web. In some of these embodiments, particles may be applied to the major surface of the film opposite the fibrous web to provide a matte finish. In some embodiments, the major surface of the film opposite the fibrous web may be flocked with a fibrous material, such as any of those described above, to give the film a soft feeling. In other embodiments, pattern-embossing major surface of the film opposite the fibrous web can provide an appearance or feeling of a fibrous material.

Films useful for practicing the present disclosure are typically extensible in the cross-machine direction (which is typically transverse to the direction of the longitudinally extending first and second regions), and less extensible in the machine direction. In some embodiments, the film disclosed herein has an elongation of at least 75 (in some embodiments, at least 100, 200, 250, or 300) percent and up to 1000 (in some embodiments, up to 750 or 500) percent). In some embodiments, films disclosed herein will sustain only small permanent set following deformation and relaxation (in some embodiments, less than 25, 20, or even less than 10 percent) of the original length after 100% elongation at room temperature. As used herein, elongation and permanent set are determined using the test method described in the Examples, below.

In some embodiments of the incrementally activated laminate according to and/or made according to the present disclosure, a recoverable elongation of the laminate is at least 50% of the recoverable elongation of a comparative film after elongation of 100%. The recoverable elongation can be understood to be the maximum elongation that provides the film or laminate with a permanent set of up to 20%, in some embodiments, up to 15% or 10%. As used herein, recoverable elongation is determined using the test method described in the Examples, below. The comparative film is the same as the film comprising alternating first and second regions except that it is not laminated to the incrementally activated fibrous web. The comparative film may be a film that is removed from the laminate, for example, by submerging the laminate in liquid nitrogen and peeling apart the fibrous web and the film. Or the comparative film may be a sample made identically to the film comprising alternating first and second regions but never laminated to an extensible fibrous web. In some embodiments, a recoverable elongation of the laminate is at least 75%, 80%, 85%, 90% or 95% of the recoverable elongation of a comparative film after elongation of 100%. In any of these embodiments, there is not a large amount of unused elasticity in the elastic film. For example, if an elastic film made completely of elastic polymers as described above has recoverable elongation of 800%, but after lamination to a fibrous web and incremental activated, only a recoverable elongation of about 200% can be achieved due to the limitations of the incremental stretching apparatus, there is a large amount of elasticity in the film that is unused. Since more elastic polymers are typically more expensive than less elastic polymers, the unused elasticity is related to unnecessary expense. In the incrementally activated laminates according to the present disclosure, the alternating first and second regions allow for a lower amount of elastic polymers to be used while maintaining useful elongations. Also, where the comparative film is a sample made identically to the film comprising alternating first and second regions but never laminated to a fibrous web and subsequently incrementally stretched, when the recoverable elongation of the laminate is at least 50% (in some embodiments, 75%, 80%, 85%, 90%, or 95%) of the recoverable elongation of a comparative film at after elongation of 100%, it is an indication that the incremental stretching did not plastically deform the first regions of the film.

In some embodiments of extensible laminates according to the present disclosure, the fibrous web is extensible, for example, without incremental activation. One or more zones of the fibrous web or the entire fibrous web may comprise one or more elastically extensible materials. In some embodiments, the extensible fibrous web is a nonwoven web that can be made by any of the nonwoven processes described above. The fibers for the nonwoven web may be made from elastic polymers, for example, any of those described above in connection with the elastic polymeric compositions in the second regions of the film disclosed herein. In some embodiments of the extensible laminate, the fibrous web may be extensible but inelastic. In other words, the fibrous web may have an elongation of at least 5, 10, 15, 20, 25, 30, 40, or 50 percent but may not recover to a large extent from the elongation (e.g., up to 40, 25, 20, 10 or 5 percent recovery). Suitable extensible fibrous webs may include nonwovens (e.g., spunbond, spunbond meltblown spunbond, spunlace, or carded nonwovens). In some embodiments, the nonwoven may be a high elongation carded nonwoven (e.g., HEC). In some embodiments, the fibrous web may form pleats after it is extended. In other embodiments, the fibrous web is not pleated.

Any of the embodiments of the extensible laminate disclosed herein may include films having alternating first and second regions in any of their embodiments described above for the films in the incrementally activated laminates described herein. For example, in the extensible laminates disclosed herein, the film may have a construction as film 5, 105, or 305, shown in FIG. 1A, 1B, or 1C, in any of their embodiments. The film may have any of the dimensions and the made from any of the processes and materials described above for the films in the incrementally activated laminates.

For embodiments of the extensible laminates according to and/or made by a method according to the present disclosure, wherein the carrier is an elastic or extensible fibrous web, a tensile elongation at maximum load of the film is up to 250 percent of the tensile elongation at maximum load of the extensible fibrous web. In embodiments in which the film undergoes plastic deformation before breaking, the tensile elongation at maximum load of the film is the elongation at the point where the film begins to undergo plastic deformation. This extension is readily recognizable as a shoulder in a stress strain curve measured as described in the Examples, below. In embodiments in which the film does not undergo plastic deformation before breaking, the tensile elongation at maximum load is the tensile elongation at break. The tensile elongation at maximum load of the fibrous web is generally the tensile elongation at break. In some embodiments, a tensile elongation at maximum load of the film is in a range from 25 percent to 250 percent, 50 percent to 225 percent, 75 percent to 200 percent, or 75 percent to 150 percent of the tensile elongation at maximum load of the extensible fibrous web. It is useful in laminates disclosed herein for the tensile elongation at maximum load of the film and the fibrous web to be comparable. Again in any of these embodiments, there is not a large amount of unused elasticity in the elastic film for the reasons described above. Also, the distribution of first and second regions alternating across the film allow for more uniform extension than, for example, if only one region of elasticity was used in the film. This distribution of stripes and strands regions better utilizes the extensible potential of the extensible fibrous web. Furthermore, when the tensile elongation of the extensible fibrous web and the film are similar, delamination of the extensible fibrous web and the film is less likely to occur than when, for example, the elastic film is more than 250% more extensible than the fibrous web. As shown in Illustrative Examples 5 to 8 below, films with elongations that are much higher than fibrous webs to which they are laminated can undergo stretch-induced delamination of the fibrous and continue to stretch after the delamination.

In some embodiments of the extensible laminate according to and/or made according to the present disclosure, a recoverable elongation of the laminate is at least 50% of the recoverable elongation of a comparative film after elongation of 100%. The comparative film is the same as the film comprising alternating first and second regions except that it is not laminated to the extensible fibrous web. In some embodiments, a recoverable elongation of the laminate is at least 75%, 80%, 85%, 90% or 95% of the recoverable elongation of a comparative film after elongation of 100%. Again, in any of these embodiments, there is not a large amount of unused elasticity in the elastic film. Also, in embodiments in which the carrier is an extensible fibrous web, the distribution of first and second regions better utilizes the recoverable elongation of the extensible fibrous web as described above.

In some embodiments of the extensible laminate according to and/or made from a method according to the present disclosure, a film with alternating first and second regions can be selected such that it has a relative low force to initially stretch the film. For example, film 5 shown in FIG. 1A, in which more elastic second regions 4 are exposed on the surface of the film may be used. For film 105, sheaths 108 that are made from a softer, lower modulus material than the first regions 110 may be used. Furthermore, for film 305, the thickness of the skin regions may be minimized. For lowering the force to initially stretch the film, to maximize the elongation, and to lower the hysteresis of the film, it may also be useful to prepare the film such that the thickness of the first regions is within about 20%, 10%, or 5% of the thickness of the second regions. In these cases, the first regions may be said to have substantially the same thickness as the second regions. The melt viscosities of the selected resins influence the thicknesses of the first and second regions. Resins may be selected for their melt viscosities, or, in some embodiments, a tackifier or other viscosity-reducing additive may be useful to decrease the melt viscosity of the resin, for example, the elastic polymeric composition.

Extensible laminates according to the present disclosure can be made using any of the methods described above for joining the film having alternating first and second regions to the extensible fibrous web. Extensible laminates according to the present disclosure can advantageously be made by bonding under pressure discontinuously at discrete bond locations. The bonding can be carried out by a patterned embossing roll in which the pattern (that is, raised area) of the embossing roll provides up to about 30%, 25%, or 20% of the surface of the embossing roll. We have unexpectedly found that patterned bonding can be carried out in a nip at a temperature of up to 60° C., 55° C., 50° C., 40° C., 30° C., or even 25° C. using a pressure of at least one megapascal (MPa) (in some embodiments, 1.1, 1.2, 1.3, or 1.35 MPa). As shown in Examples 5 to 20, reliable laminates with good elastic properties can be made using this method without the use of adhesives and without incremental stretching. No delamination was observed upon tensile elongation of the laminates.

In some embodiments, when the film comprising alternating first and second regions strands has second regions that are strands comprising a core and a sheath, the distance between the two first regions separated by one second region is in a range from 300 micrometers to 11 mm, 400 micrometers to 5 mm, 400 micrometers to 3 mm, or 500 micrometers to 3 mm; the second regions may be in a range from 100 micrometers to 4 mm, 150 micrometers to 1 mm, 150 micrometers to 750 micrometers, or 200 micrometers to 600 micrometers wide; and the first regions may be in a range from 250 micrometers to 5 mm, 250 micrometers to 1 mm, or 500 micrometers to 1 mm wide. With the first and second regions have dimensions in these ranges, the film can reliably be made at unexpectedly fast line speeds using an apparatus as shown in FIGS. 2 to 10. For example, as described in Film Examples A and B, below, at 10 lbs/inch/hour (10.7 kg/cm/hour), a film useful for practicing the present disclosure that was 12 micrometers thick was prepared at 300 feet per minute (91 meters per minute) or 400 feet per minute (122 meters per minute). In contrast, as described in the Comparative Film Example, below, using a method described in Example 1 of Int. Pat. App. Pub. No. WO 2011/119323 (Ausen et al.), which uses an extrusion die that comprises a plurality of shims and has two cavities for molten polymer, a film have lane widths of 40 micrometers and 200 micrometers of a thermoplastic elastomer and a polypropylene, respectively, could be made at a line speed of only up to 15 feet per minute (4.6 meters per minute) before reaching the maximum die pressure of 4500 psi (31 megapascals). Furthermore, second regions greater than 4 mm, 1 mm, or 750 micrometers in width tend to neck down upon elongation of the film, resulting in a scalloped edge in the second regions.

Laminates according to and/or made according to the present disclosure have a variety of uses, including wound care and other medical applications (e.g., elastic bandage-like material, surface layer for surgical drapes and gowns, and cast padding), tapes (including for medical applications), and absorbent articles. Examples of disposable absorbent articles include infant diapers or training pants, products for adult incontinence, and feminine hygiene products (e.g., sanitary napkins and panty liners). A typical disposable absorbent garment of this type is formed as a composite structure including an absorbent assembly disposed between a liquid permeable bodyside liner and a liquid impermeable outer cover. These components can be combined with laminates disclosed herein and other materials and features such as further elastic components or containment structures to form the absorbent article. In some of these embodiments, the resulting laminate may be a fastening tab, for example, for an absorbent article. In some embodiments, the resulting laminate may be an extensible ear, for example, for an absorbent article.

Figure 11:
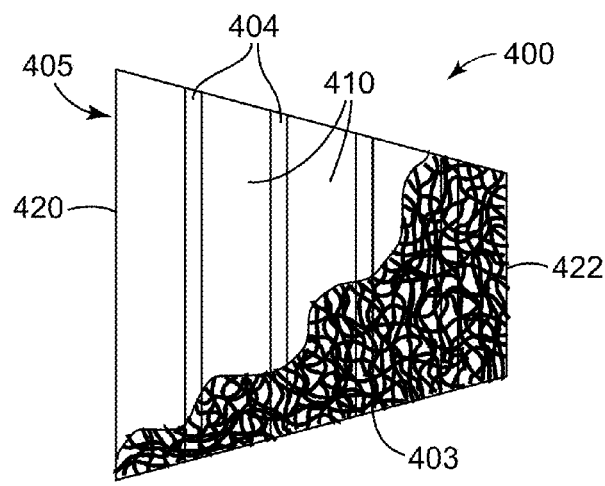
FIG. 11 is a top view of one embodiment of a laminate according to the present disclosure.

In some of these embodiments, the laminate may be in the shape of a trapezoid, for example, as shown in FIG. 11. In FIG. 11, laminate 400 includes fibrous web 403 and film 405 having alternating first regions 410 and second regions 404. The direction of the first regions 410 and second regions 404 is generally parallel to the parallel sides 420 and 422 of the trapezoid. Film 405 may have any of the constructions shown in the end views of FIGS. 1A to 1C and may be made according to any of the processes described above. While it has been observed that in a typical extensible ear shaped to have a narrower end (e.g., for a hook fastener) and a wider end (e.g., for attachment to an absorbent article), the majority of the stretch occurs at the narrow end of the ear. This can result in unused elastomeric potential, weaker tensile properties, and delamination of the fibrous web if narrow end stretches beyond the fibrous web's extension capability. In contrast, we have observed that a film having alternating first and second regions as described herein stretches substantially evenly across the entire width of the extensible ear, even when having a trapezoid shape as in laminate 400.

Some Embodiments of the Disclosure

In a first embodiment, the present disclosure provides an incrementally activated laminate comprising:

an incrementally activated fibrous web having an activation pitch; and a film comprising alternating first and second regions laminated to the incrementally activated fibrous web, wherein the first regions comprise a first polymeric composition, wherein the second regions comprise an elastic polymeric composition that is more elastic than the first polymeric composition, wherein a distance between midpoints of two first regions separated by one second region is smaller than the activation pitch, and wherein the first regions are not plastically deformed.

In a second embodiment, the present disclosure provides the incrementally activated laminate of the first embodiment, wherein the first regions make up a higher volume percentage of the film than the second regions.

In a third embodiment, the present disclosure provides the incrementally activated laminate of the first or second embodiment, wherein the second regions are strands comprising a core and a sheath, wherein the core is more elastic than the sheath.

In a fourth embodiment, the present disclosure provides the incrementally activated laminate of the first or second embodiment, wherein the second regions comprise strands embedded in a matrix of the first polymeric composition that is continuous with the first regions.

In a fifth embodiment, the present disclosure provides the incrementally activated laminate of the first or second embodiment, wherein the first and second regions are alternating side-by-side stripes comprising the first polymeric composition and the elastic polymeric composition, respectively.

In a sixth embodiment, the present disclosure provides the incrementally activated laminate of any one of the first to fifth embodiments, wherein the recoverable stretch of the laminate is at least fifty percent of the recoverable stretch of a comparative film after elongation of 100 percent, wherein the comparative film is the same as the film comprising alternating first and second regions except that it is not laminated to the incrementally activated fibrous web.

In a seventh embodiment, the present disclosure provides the incrementally activated laminate of any one of the first to sixth embodiments, wherein the incrementally activated fibrous web is an incrementally activated nonwoven web.

In an eighth embodiment, the present disclosure provides the incrementally activated laminate of any one of the first to seventh embodiments, wherein the distance between midpoints of the two first regions separated by one second region is up to 11 millimeters, and wherein the second regions each have a width up to 4 millimeters.

In a ninth embodiment, the present disclosure provides the incrementally activated laminate of any one of the first to eighth embodiments, wherein the distance between midpoints of the two first regions separated by one second region is up to 3 millimeters, and wherein the second regions each have a width in a range from 100 micrometers to 750 micrometers.

In a tenth embodiment, the present disclosure provides the incrementally activated laminate of any one of the first to ninth embodiments, wherein the first regions include apertures.

In an eleventh embodiment, the present disclosure provides the incrementally activated laminate of any one of the first to tenth embodiments, wherein at least portions of the first and second regions are different colors.

In a twelfth embodiment, the present disclosure provides a method of making an incrementally stretched laminate, the method comprising:

laminating a fibrous web and a film comprising alternating first and second regions to form a laminate, wherein the first regions comprise a first polymeric composition, and the second regions comprise an elastic polymeric composition that is more elastic than the first polymeric composition; and passing the laminate between intermeshing surfaces to provide an incrementally stretched laminate, wherein a distance between midpoints of two first regions separated by one second region is smaller than the pitch of one of the intermeshing surfaces, and wherein the first regions are not plastically deformed.

In a thirteenth embodiment, the present disclosure provides the method of the twelfth embodiment, wherein the first regions make up a higher volume percentage of the film than the second regions.

In a fourteenth embodiment, the present disclosure provides the method of the twelfth or thirteenth embodiment, wherein the second regions are strands comprising a core and a sheath, wherein the core comprises the elastic polymeric composition and is more elastic than the sheath.

In a fifteenth embodiment, the present disclosure provides the method of the twelfth or thirteenth embodiment, wherein the second regions comprise strands of the elastic polymeric composition embedded in a matrix of the first polymeric composition that is continuous with the first regions.

In a sixteenth embodiment, the present disclosure provides the method of the twelfth or thirteenth embodiment, wherein the first and second regions are alternating side-by-side stripes comprising the first polymeric composition and the elastic polymeric composition, respectively.

In a seventeenth embodiment, the present disclosure provides the method of any one of the twelfth to sixteenth embodiments, wherein the recoverable stretch of the laminate is at least fifty percent of the recoverable stretch of a comparative film, wherein the comparative film is the same as the film comprising alternating first and second regions except that it is not laminated to the incrementally activated fibrous web.

In an eighteenth embodiment, the present disclosure provides the method of any one of the twelfth to seventeenth embodiments, wherein the incrementally activated fibrous web is an incrementally activated nonwoven web.

In a nineteenth embodiment, the present disclosure provides the method of any one of the twelfth to eighteenth embodiments, wherein the distance between midpoints of the two first regions separated by one second region is up to 11 millimeters, and wherein the second regions each have a width up to 4 millimeters.

In a twentieth embodiment, the present disclosure provides the method of any one of the twelfth to nineteenth embodiments, wherein the distance between midpoints of the two first regions separated by one second region is up to 3 millimeters, and wherein the second regions each have a width in a range from 100 micrometers to 750 micrometers.

In a twenty-first embodiment, the present disclosure provides the method of any one of the twelfth to twentieth embodiments, wherein the first regions include apertures.

In a twenty-second embodiment, the present disclosure provides the method of any one of the twelfth to twenty-first embodiment, wherein at least portions of the first and second regions are different colors.

In a twenty-third embodiment, the present disclosure provides an extensible laminate comprising:

an extensible fibrous web; and a film comprising alternating first and second regions laminated to the extensible fibrous web, wherein the first regions comprise a first polymeric composition, wherein the second regions comprise an elastic polymeric composition that is more elastic than the first polymeric composition, and wherein a tensile elongation at maximum load of the film is up to 250 percent of the tensile elongation at maximum load of the extensible fibrous web.

In a twenty-fourth embodiment, the present disclosure provides the extensible laminate of the twenty-third embodiment, wherein a tensile elongation at maximum load of the film is in a range from 25 to 250 percent of the tensile elongation at maximum load of the extensible fibrous web.

In a twenty-five embodiment, the present disclosure provides the extensible laminate of the twenty-third or twenty-fourth embodiment, wherein the first regions make up a higher volume percentage of the film than the second regions.

In a twenty-sixth embodiment, the present disclosure provides the extensible laminate of any one of the twenty-third to twenty-fifth embodiments, wherein the second regions are strands comprising a core and a sheath, wherein the core comprises the elastic polymeric composition and is more elastic than the sheath.

In a twenty-seventh embodiment, the present disclosure provides the extensible laminate of any one of the twenty-third to twenty-fifth embodiments, wherein the second regions comprise strands of the elastic polymeric composition embedded in a matrix of the first polymeric composition that is continuous with the first regions.

In a twenty-eighth embodiment, the present disclosure provides the extensible laminate of any one of the twenty-third to twenty-fifth embodiments, wherein the first and second regions are alternating side-by-side stripes comprising the first polymeric composition and the elastic polymeric composition, respectively.

In a twenty-ninth embodiment, the present disclosure provides the extensible laminate of any one of the twenty-third to twenty-eighth embodiments, wherein the second regions each have a width in a range from 100 micrometers to 750 micrometers, and wherein the first regions each have a width in a range from 250 micrometers to 2 millimeters.

In a thirtieth embodiment, the present disclosure provides the extensible laminate of any one of the twenty-third to twenty-ninth embodiments, wherein the extensible fibrous web is an extensible nonwoven web.

In a thirty-first embodiment, the present disclosure provides the extensible laminate of any one of the twenty-third to thirtieth embodiments, wherein the first regions include apertures, and/or wherein at least portions of the first and second regions are different colors.

In a thirty-second embodiment, the present disclosure provides the extensible laminate of any one of the twenty-third to thirty-first embodiments, wherein the extensible fibrous web and the film are discontinuously bonded at discrete bond locations.

In a thirty-third embodiment, the present disclosure provides a method of making an extensible laminate, the method comprising:

laminating an extensible fibrous web and a film comprising alternating first and second regions to form an extensible laminate, wherein the first regions comprise a first polymeric composition, and the second regions comprise an elastic polymeric composition that is more elastic than the first polymeric composition, and wherein a tensile elongation at maximum load of the film is up to 250 percent of the tensile elongation at maximum load of the extensible fibrous web.

In a thirty-fourth embodiment, the present disclosure provides the method of the thirty-third embodiment, wherein a tensile elongation at maximum load of the film is in a range from 25 to 250 percent of the tensile elongation at maximum load of the extensible fibrous web.

In a thirty-five embodiment, the present disclosure provides the method of the thirty-third or thirty-fourth embodiment, wherein the first regions make up a higher volume percentage of the film than the second regions.

In a thirty-sixth embodiment, the present disclosure provides the method of any one of the thirty-third to thirty-fifth embodiments, wherein the second regions are strands comprising a core and a sheath, wherein the core comprises the elastic polymeric composition and is more elastic than the sheath.

In a thirty-seventh embodiment, the present disclosure provides the method of any one of the thirty-third to thirty-fifth embodiments, wherein the second regions comprise strands of the elastic polymeric composition embedded in a matrix of the first polymeric composition that is continuous with the first regions.

In a thirty-eighth embodiment, the present disclosure provides the method of any one of the thirty-third to thirty-fifth embodiments, wherein the first and second regions are alternating side-by-side stripes comprising the first polymeric composition and the elastic polymeric composition, respectively.

In a thirty-ninth embodiment, the present disclosure provides the method of any one of the thirty-third to thirty-eighth embodiments, wherein the second regions each have a width in a range from 100 micrometers to 750 micrometers, and wherein the first regions each have a width in a range from 250 micrometers to 2 millimeters.

In a fortieth embodiment, the present disclosure provides the method of any one of the thirty-third to thirty-ninth embodiments, wherein the extensible fibrous web is an extensible nonwoven web.

In a forty-first embodiment, the present disclosure provides the method of any one of the thirty-third to fortieth embodiments, wherein the first regions include apertures.

In a forty-second embodiment, the present disclosure provides the method of any one of the thirty-third to forty-first embodiments, wherein at least portions of the first and second regions are different colors.

In a forty-third embodiment, the present disclosure provides the method of any one of the thirty-third to forty-second embodiments, wherein laminating comprises discontinuously bonding at discrete bond locations.

In a forty-fourth embodiment, the present disclosure provides the method of any one of the thirty-third to forty-third embodiments, wherein laminating comprises passing the extensible fibrous web and the film through a nip formed by two rolls, wherein at least one of the rolls is a patterned roll, wherein the temperature of at least one of the two rolls is up to 60° C., and wherein the pressure in the nip is at least one megapascal.

In a forty-fifth embodiment, the present disclosure provides an absorbent article comprising the laminate of any one of the first to eleventh embodiments or any one of the twenty-third to thirty-second embodiments.

In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Cross machine direction tensile (tensile elongation to break) and cross machine direction 2-cycle hysteresis (to 100% elongation) were done for all the samples on an "INSTRON" tensile tester (obtained from Instron Corporation, Norwood, Mass.) using a minimum of 3 replicates. The "INSTRON" tensile tester was one of models "1122", "5500R", "5564HS", or "3345" universal constant rate of extension tensile testing tester with strip chart recorder or computer and "BLUEHILL" material testing software obtained from Instron Corporation. The instrument was calibrated to an accuracy of one percent of the full scale and the scale range used for the test was within 20-90 percent of full range.

The samples for evaluation were all 1 inch (2.54 cm) wide and 50 mm gauge length (GL). A crosshead speed of 20 inches (50.8 cm) per minute was used. Evaluations were carried out at 72° F. (22° C.) plus or minus 4° F. (2.2° C.) and 50% relative humidity plus or minus 5% relative humidity. For Examples 13 to 17 and Illustrative Examples 1 to 4 a gauge length of 45 mm was used. During the two-cycle hysteresis measurement, there was a one-second hold before the first load to 100%, a one-second hold before the first unload to 0%, a one-second hold before the second load to 100%, and a one-second hold before the second unload to 0%.

Permanent set was determined from the two-cycle hysteresis, where the return speed was also 20 inches (50.8 cm) per minute. Permanent set was calculated from the elongation (%) (i.e., tensile strain) at 0.1 N after the second unload minus the elongation (%) (i.e., tensile strain) at 0.1 N at the first load.

Example 1

A co-extrusion die with three cavities, as generally depicted in FIG. 10, and assembled with a shim repeating pattern as generally illustrated in FIGS. 6 to 8, was prepared. The orifice height of the dispensing slot was 0.030 inch (0.762 mm). The die did not include zones 212, 216, 218, or 214 as shown in FIG. 7. The orifice was created with a repeat sequence of 18 shims. One spacer shim 4740, depicted in FIG. 4, followed by one shim 4640 with connection to a second cavity 4562a, depicted in FIG. 3, followed by one spacer shim 4740, followed by 2 identical shims 4840 with connection to the third cavity 4562c, depicted in FIG. 5, followed by one spacer shim 4740, followed by one shim 4640 with connection to the second cavity 4562a, followed by one spacer shim 4740, followed by ten identical shims 4540 with connection to the first cavity 4562b, depicted in FIG. 2, were stacked together in a repeating sequence of 95 repeats. The thickness of the shims in the repeat sequence was 0.004 inch (0.102 mm) for shims 4540 and 4840 and 0.002 inch (0.051 mm) for shims 4640 and 4740. The dispensing opening of shim 4840 had a height at constriction 4896 of 0.012 inch (0.30 mm). The extrusion orifices of the shims were aligned in a collinear arrangement as shown in FIG. 10. The total width of the shim setup was 145 mm. The shim assembly was aligned using the alignment key on a vibrating table and compressed between two end blocks with four ½ inch (12.7 mm) bolts.

The inlet fittings on the two end blocks were each connected to conventional single-screw extruders. A chill roll was positioned adjacent to the distal opening of the co-extrusion die to receive the extruded material. The extruders feeding the first and second cavities were loaded with a mixture of 25% by weight polypropylene pellets (obtained under the trade designation "EXXONMOBIL PP1024E4" from ExxonMobil, Irving, Tex., and having a melt flow index of 12) and 75% by weight polypropylene pellets (obtained under the trade designation "3376" from Total Petrochemicals, Houston, Tex., but no longer available, and having a melt flow index of 3), and with 5% of a white color concentrate in 50% polypropylene. The extruder feeding the third cavity was loaded with styrene isoprene styrene block copolymer pellets (obtained under the trade designation "KRATON D1114 P" polymer from Kraton Polymers, Houston, Tex.).

The melt was extruded vertically into an extrusion quench takeaway nip. The quench nip was a smooth temperature controlled chrome plated 20 cm diameter steel roll and an 11 cm diameter silicone rubber roll. The rubber roll was approximately 60 durometer. Both were temperature controlled with internal water flow. The nip pressure was generated with 2 pressurized air cylinders. The web path wrapped 180 degrees around the chrome steel roll and then to a windup roll.

Other process conditions are as follows. The flow rate of first polymer was 4.1 kg/hr. The flow rate of second polymer was 0.4 kg/hr. The flow rate of the third polymer was 1.3 kg/hr. The extrusion temperature was 227° C. The quench roll temperature was 16° C. The quench takeaway speed was 17 m/minute. The basis weight of film was 42 grams per square meter.

Using an optical microscope, the following film dimensions were measured:
  width of first regions (including first polymer)=1.3 millimeters
  width of second regions (including core/sheath strands)= 463 micrometers Elongation to break of the film was measured using the test method described above using three replicates, and the average was 251%. Permanent set of the film was measured using the test method described above using three replicates, and the average was 6.7%. Load 1 at 50% elongation=2.6 N, Load 2 at 50% elongation=1.0 N.

The film was converted to 55 mm in width. The film was adhesively laminated between two 22 gsm hydrophobic nonwovens measuring 90 mm in width obtained from Fitesa, Simpsonville, S.C., having item number "C1223" and style number "570D". The film was positioned between two nonwoven layers, equidistant from the edges. A hot melt adhesive obtained from H.B. Fuller, St. Paul, Minn., under the trade designation "HL-2900" was used to bond the layers together. Spray heads available from ITW, Glenview, Ill., (part 105224F—13 orifices per inch) were used to apply the adhesive at 311° F. (155° C.). The spray was delivered in an all over pattern coating. The lamination of the three layers occurred in two passes. Bonding the film to the first nonwoven required two 1-inch (2.54-cm) and one 0.5-inch (1.27-cm) spray heads. During the second pass, the 0.5-inch (1.27-cm) spray head was replaced with a 1-inch (2.54-cm) spray head for a total of three 1-inch (2.54-cm) spray heads. The air pressure of the spray heads was 30 psi ($2.1 \times 10^5$ Pa). The sample was processed at 10 feet per minute while using a Nordson Microset Multi Scan Series 3500 pump, obtained from Nordson, Westlake, Ohio. The pump's flow rate was at 40% capacity. This amounted to approximately 50 grams per square meter of adhesive on the laminate (25 gsm per side). The nonwovens were lightly pressed.

The laminate was incrementally stretched across the entire width in the cross-direction at Biax-Fiberfilm Corporation, Greenville, Wis. The stretching apparatus was one meter wide and contained discs that had a thickness of 0.03 inch (0.76 mm) and a diameter of 10.0 inches (25.4 cm). The pitch of the discs was 0.130 inch (3.3 mm). The material was processes at 30 feet per minute with a depth of engagement of 0.115 inch (0.292 mm).

Elongation to break of the laminate was measured using the test method described above using three replicates, and the average was 207%. Permanent set of the laminate was measured using the test method described above using three replicates, and the average was 14%. Load 1 at 50% elongation=3.2 N, Load 2 at 50% elongation=1.2 N.

Example 2

Example 2 was made using the method of Example 1, with the following modifications. The extrusion die was comprised of three zones to create a first zone of a polymer ribbon region, a second zone to provide an extensible region having alternating stripes and core/sheath strands in a film, and then a third zone of a polymer ribbon region. The first and third zones were created with a repeat sequence of 7 shims to create a zone width of about 45 mm with the number of repeats necessary to give 45 mm. Five identical shims 4540, with connection to the first cavity 4562b, depicted in FIG. 2, followed by two spacer shims 4740, depicted in FIG. 4 were thus stacked together in a repeating sequence to create zone 1 and zone 3. The thickness of the shims in the repeat sequence was 0.04 inch (0.102 mm) for shims 4540 and 0.02 inch (0.051 mm) for shims 4740. To create zone 2, one spacer shim 4740, depicted in FIG. 4, followed by one shim 4640 with connection to a second cavity 4562a, depicted in FIG. 3, followed by one spacer shim 4740, followed by 2 identical shims 4840 with connection to the third cavity 4562c, depicted in FIG. 5, followed by one spacer shim 4740, followed by one shim 4640 with connection to the second cavity 4562a, followed by one spacer shim 4740, followed by four identical shims 4540 with connection to the first cavity 4562b, were stacked together in a repeating sequence. The thickness of the shims in the repeat sequence was 0.04 inch (0.102 mm) for shims 4540 and 4840 and 0.02 inch (0.051 mm) for shims 4640 and 4740. The total width of the shim setup was 160 mm.

The extruder feeding the first cavity was loaded with a mixture of 50% by weight polypropylene pellets (obtained under the trade designation "3376" from Total Petrochemicals) and 50% by weight polypropylene pellets (obtained under the trade designation "EXXONMOBIL PP1024E4" from ExxonMobil and having a melt flow index of 12) and with less than 2% of a white color concentrate in 50% polypropylene. The extruder feeding the second cavity was loaded with the same mixture of as that feeding the first cavity except using less than 2% of a blue color concentrate in 50% polypropylene. The extruder feeding the third cavity was loaded with the same polymeric composition described in Example 1. The flow rate of first polymer was 2.9 kg/hr. The flow rate of second polymer was 0.16 kg/hr. The flow rate of the third polymer was 1.0 kg/hr. The basis weight of film was 38 grams per square meter.

Using an optical microscope, the following film dimensions were measured:
  width of first regions (including first polymer)=566 micrometers
  width of second regions (including core/sheath strands)=302 micrometers Elongation to break of the film was measured using the test method described above using three replicates, and the average was 457%. Permanent set of the film was measured using the test method described above using three replicates, and the average was 8.94%. Load 1 at 50% elongation=2.6 N, Load 2 at 50% elongation=1.3 N.

The lamination and incremental stretching methods of Example 1 were then carried out to provide Example 2. Elongation to break of the laminate was measured using the test method described above using three replicates, and the average was 299%. Permanent set of the laminate was measured using the test method described above using three replicates, and the average was 17.2%. Load 1 at 50% elongation=4.4 N, Load 2 at 50% elongation=1.6 N.

Example 3

The film prepared in Example 2 was adhesively laminated to two 22 gsm hydrophobic nonwovens measuring 90 mm in width obtained from Sandler AG, Schwartzenbach/Saale Germany, under the trade designation "SAWABOND 4159" using the lamination procedure described in Example 1. The laminate was then incrementally stretched using the procedure described in Example 1 to provide the laminate of Example 3. Elongation to break of the laminate was measured using the test method described above using three replicates, and the average was 321%. Permanent set of the laminate was measured using the test method described above using three replicates, and the average was 15.1%. Load 1 at 50% elongation=3.7 N, Load 2 at 50% elongation=1.5 N.

Example 4

The film made in Example 2 was adhesively laminated to two 25 gsm spunlaced nonwovens measuring 90 mm in width obtained from Sandler AG, under the trade designation "SAWATEX 22628" using the lamination procedure described in Example 1. The laminate was then incrementally stretched using the procedure described in Example 1 to provide the laminate of Example 4. Elongation to break of the laminate was measured using the test method described above using three replicates, and the average was 243%. Permanent set of the laminate was measured using the test method described above using three replicates, and the average was 17.2%. Load 1 at 50% elongation=3.2 N, Load 2 at 50% elongation=1.5 N.

Illustrative Example 1

The laminate of Illustrative Example 1 was prepared according to the method of Example 1 with the following modifications. In the repeat sequence of shims for the co-extrusion die, the ten identical shims 4540 with connection to the first cavity 4562b, depicted in FIG. 2 was replaced with forty shims 4540 with connection to the first cavity 4562b interrupted by a spacer shim 4740, depicted in FIG. 4, after every ten shims. The total width of shims used to create the first region was 166 mils (4.15 mm). The flow rate of first polymer was 3.1 kg/hr. The flow rate of second polymer was 0.2 kg/hr. The flow rate of the third polymer was 0.8 kg/hr. The extrusion temperature and quench roll temperature were the same as in Example 1. The quench takeaway speed was 15 m/minute. The basis weight of film was 40 grams per square meter.

Elongation to break of the film was measured using the test method described above using three replicates, and the average was 79.2%. Since the elongation to break was less than 100%, the permanent set was not measured according to the test method above.

Using an optical microscope, the following film dimensions were measured:
 width of first regions (including first polymer)=4.45 mm
 width of second regions (including core/sheath strands) =355 micrometers The lamination and incremental stretching methods of Example 1 were then carried out to provide Illustrative Example 1. Elongation to break of the laminate was measured using the test method described above using three replicates, and the average was 71.6%. Since the elongation to break was less than 100%, the permanent set was not measured according to the test method above. Load 1 at 50% elongation=5.0 N.

Illustrative Example 2

Illustrative Example 2 was made according to the method of Illustrative Example 1 except the flow rate of the third polymer was 0.4 kg/hr.

Elongation to break of the film was measured using the test method described above using three replicates, and the average was 24.1%. Since the elongation to break was less than 100%, the permanent set was not measured according to the test method above.

Using an optical microscope, the following film dimensions were measured:
 width of first regions (including first polymer)=4.65 mm
 width of second regions (including core/sheath strands)= 187 micrometers A photomicrograph of the laminate made in Illustrative Example 2 is shown in FIG. 12.

Elongation to break of the laminate was measured using the test method described above using three replicates, and the average was 150.5%. In this sample, the nonwoven continued to stretch even after partially breaking. Permanent set of the laminate was measured using the test method described above using three replicates. One sample broke, and the average of the other two samples was 71.4%. Load 1 at 50% elongation=2.4 N, Load 2 at 50% elongation=0.7 N.

Illustrative Example 3

The laminate of Illustrative Example 3 was prepared according to the method of Example 1 with the following modifications. In the repeat sequence of shims for the co-extrusion die, the ten identical shims 4540 with connection to the first cavity 4562b, depicted in FIG. 2, were replaced with forty shims 4540 with connection to the first cavity 4562b interrupted by a spacer shim 4740, depicted in FIG. 4, after every ten shims. The total width of shims used to create the first region was 166 mils (4.15 mm). Also, the two identical shims 4840 with connection to the third cavity 4562c, depicted in FIG. 5, were replaced with eight shims 4840 with connection to the third cavity 4562c interrupted by a spacer shim 4740, depicted in FIG. 4, after every two shims. The total width of shims used to create the core region from the third cavity was 38 mils (0.95 mm). The extruders feeding the first and second cavities were loaded with polypropylene pellets (obtained under the trade designation "EXXONMOBIL PP1024E4" from ExxonMobil) with 5% of a white color concentrate in 50% polypropylene.

The flow rate of first polymer was 4.5 kg/hr. The flow rate of second polymer was 0.2 kg/hr. The flow rate of the third polymer was 1.4 kg/hr. The extrusion temperature was 218° C. The quench roll temperature was 16° C. The quench takeaway speed was 15 m/minute. The basis weight of film was 43 grams per square meter.

Elongation to break of the film was measured using the test method described above using three replicates, and the average was 103%. Permanent set of the laminate was measured using the test method described above using three replicates. One sample broke, and the average of the other two samples was 11.4%. Load 1 at 50% elongation=7.4 N, Load 2 at 50% elongation for the two samples that did not break=2.9 N.

Using an optical microscope, the following film dimensions were measured:
 width of first regions (including first polymer)=4.89 millimeters
 width of second regions (including core/sheath strands) =544 micrometers The lamination and incremental stretching methods of Example 1 were then carried out to provide Illustrative Example 3.

Elongation to break of the laminate was measured using the test method described above using three replicates, and the average was 110%. Permanent set of the laminate was measured using the test method described above using three replicates. One sample broke, and the average of the other two samples was 28%. Load 1 at 50% elongation=6.6 N, Load 2 at 50% elongation for the two samples that did not break=2.4 N.

Illustrative Example 4

Illustrative Example 4 was made according to the method of Illustrative Example 3 except the flow rate of the first polymer was 4.1 kg/hr.

Elongation to break of the film was measured using the test method described above using three replicates, and the average was 137%. Permanent set of the film was measured using the test method described above using three replicates. One sample broke, and the average of the other two samples was 5.1%. Load 1 at 50% elongation=4.6 N, Load 2 at 50% elongation for the two samples that did not break=2.9 N.

Using an optical microscope, the following film dimensions were measured:
  width of first regions (including first polymer)=4.64 mm
  of second regions (including core/sheath strands)=549 micrometers Elongation to break of the laminate was measured using the test method described above using three replicates, and the average was 153%. Permanent set of the laminate was measured using the test method described above using three replicates. One sample broke, and the average of the other two samples was 26%. Load 1 at 50% elongation=5.1 N, Load 2 at 50% elongation=2.4 N.

Example 5

Example 5 was carried out using the method of Example 2, with the following modifications. A transition zone that consisted of one spacer shim 4740 was added between Zone 2 and Zone 1 and between Zone 2 and Zone 3. The extruder feeding the second cavity was loaded with a mixture of approximately 50% by weight polypropylene resin (obtained under the trade designation "3376" from Total Petrochemicals) and approximately 50% by weight polypropylene resin (obtained under the trade designation "EXXONMOBIL PP1024E4" from ExxonMobil), and less than 2% white concentrate in polypropylene, which was the same as the mixture feeding the first cavity. The extruder feeding the third cavity was loaded with the same polymeric composition described in Example 1. The quench takeaway speed was 10.7 m/minute. The basis weight of film was 43 gsm.

Using an optical microscope, the following film dimensions were measured:
  width of first regions=475 micrometers
  width of strands=403 micrometers
  thickness of sheath=11.1 micrometers Elongation to break was measured using the test method described above using three replicates, and the average was 488%. Permanent set was measured using the test method described above using three replicates, and the average was 7.2%. Load 1 at 50% elongation=2.17 N, Load 2 at 50% elongation=1.27 N, Unload 2 at 50% elongation=1.01 N.

A sample of the film was sandwiched between two layers of 25 gsm spunlaced nonwoven obtained from Sandler AG under the trade designation "SAWATEX 22628". The resulting sandwich was nipped at 200 psi ($1.4 \times 10^6$ Pa) between a smooth steel roll and a patterned roll with raised bonding sites making up 14% to 17% of its surface area. Both rolls were at 75° F. (24° C.).

The spunlaced nonwoven "SAWATEX 22628" was evaluated for tensile elongation using the test method described above. The average maximum load and the tensile elongation at maximum load for an average of five samples were 5.1 N and 314%, respectively.

Elongation to break of the laminate was measured using the test method described above using three replicates, and the average was 157%. The average elongation at maximum load was 151%, and the maximum load was 5.9 N. Permanent set of the laminate was measured using the test method described above using three replicates. The average of three samples was 14.3%. Load 1 at 100% elongation=5.0 N, Load 2 at 100% elongation=4.3 N.

Examples 6 to 8

Laminate Examples 6 to 8 were prepared according to the method of Example 5 with the following modifications. For Example 6, both the smooth roll and the patterned roll were heated at 125° F. (52° C.). For Example 7, 22 gsm hydrophobic carded nonwoven obtained from Fitesa with item number "C1223" and style "570D" was used instead of the spunlace nonwoven "SAWATEX 22628". The carded nonwoven item "C1223", style "570D" from Fitesa was evaluated for tensile elongation using the test method described above. The average maximum load and the tensile elongation at maximum load for an average of five samples were 1.3 N and 199%, respectively. For Example 8, both the smooth roll and the patterned roll were heated at 125° F. (52° C.), and 22 gsm hydrophobic nonwoven obtained from Fitesa under the trade designation "570D" was used instead of the spunlace nonwoven "SAWATEX 22628". The elongation to break, elongation at maximum load, maximum load, permanent set, load 1 at 100% elongation and load 2 at 100% elongation for the laminates of Examples 6 to 8 are shown in Table 1, below.

TABLE 1

| Example | Elongation to Break (%) | Elongation at Max load (%) | Max load (N) | Permanent set (%) | Load 1 at 100% (N) | Load 2 at 100% (N) |
|---|---|---|---|---|---|---|
| 6 | 229 | 229 | 9.56 | 13.1 | 5.65 | 4.85 |
| 7 | 197 | 99 | 3.42 | 12.9 | 3.24 | 2.98 |
| 8 | 103 | 100 | 3.69 | 9.7 | 4.77 | 4.34 |

Examples 9 to 12

A film for Examples 9 to 12 was made using the method of Example 1, with the following modifications. In the repeat sequence of shims for the co-extrusion die, the ten identical shims 4540 with connection to the first cavity 4562b, depicted in FIG. 2, was replaced with four shims 4540 with connection to the first cavity 4562b. The total width of the shim set-up was 9 inches (230 mm). The extruder feeding the first cavity was loaded with polypropylene pellets (obtained under the trade designation "EXXONMOBIL PP1024E4" from ExxonMobil) and with less than 3% of a white color concentrate in 50% polypropylene. The extruder feeding the second cavity was loaded with a mixture of 60% polypropylene "EXXONMOBIL PP1024E4" obtained from ExxonMobil and 40% of an elastomeric resin obtained from Kraton Polymers under the trade designation "KRATON MD6843", with less than 3% of a white color concentrate in 50% polypropylene. The extruder feeding the third cavity was loaded with a mixture of 69% an elastomeric resin obtained under the trade designation "KRATON MD6843", obtained from Kraton Polymers, and 31% of a tackifying resin obtained from ExxonMobil under the trade designation "ESCOREZ 1310LC". The flow rate of first polymer was 10 pounds/hour (4.5 kg/hr). The flow rate of second polymer was 1.1 pounds/hour (0.5 kg/hour). The flow rate of the third polymer was 5.9 pounds/hour (2.7 kg/hour). The quench roll temperature was 15.5° C. The quench takeaway speed was 21 m/minute. The basis weight of film was 29.5 grams per square meter.

Using an optical microscope, the following film dimensions were measured:
   width of first regions=556 micrometers
   width of strands=293 micrometers
   thickness of sheath=less than 6 micrometers (Due to the size of the sheath and the lack of color contrast, the thickness of sheath was estimated with the 200× optical microscope.)

Tensile elongation at maximum load of the film was measured using the test method described above using three replicates, and the average was 229%, and the maximum load was 8.9 N. Permanent set of the film was measured using the test method described above using three replicates. The average of three samples was 10%. Load 1 at 100% elongation=2.6 N, Load 2 at 100% elongation=2.2 N.

Laminate Examples 9 to 12 were prepared according to the method of Example 5 with the following modifications. For Example 10, both the smooth roll and the patterned roll were heated at 125° F. (52° C.). For Example 11, 22 gsm hydrophobic carded nonwoven obtained from Fitesa with item number "C1223" and style "570D" was used instead of the spunlace nonwoven "SAWATEX 22628". For Example 12, both the smooth roll and the patterned roll were heated at 125° F. (52° C.), and 22 gsm hydrophobic nonwoven obtained from Fitesa with item number "C1223" and style "570D" was used instead of the spunlace nonwoven "SAWATEX 22628". The elongation to break, elongation at maximum load, maximum load, permanent set, load 1 at 100% elongation and load 2 at 100% elongation for the laminates of Examples 9 to 12 are shown in Table 2, below.

TABLE 2

| Example | Elongation to Break (%) | Elongation at Max load (%) | Max load (N) | Permanent set (%) | Load 1 at 100% (N) | Load 2 at 100% (N) |
|---|---|---|---|---|---|---|
| 9 | 137 | 122 | 7.00 | 22.6 | 5.80 | 4.42 |
| 10 | 231 | 143 | 8.30 | 15.6 | 5.25 | 4.21 |
| 11 | 145 | 117 | 7.14 | 25.1 | 6.26 | 4.77 |
| 12 | 177 | 124 | 7.06 | 17.6 | 5.36 | 4.45 |

Examples 13 to 16

Examples 13 to 16 were prepared using the method of Examples 9 to 12 with the following modifications. For the film made for Examples 13 to 16, the quench takeaway speed was 17 m/minute. The basis weight of film was 34.9 grams per square meter.

Using an optical microscope, the following film dimensions were measured:
   width of first regions=492 micrometers
   width of strands=358 micrometers
   thickness of sheath=less than 6 micrometers (Due to the size of the sheath and the lack of color contrast, the thickness of sheath was estimated with the 200× optical microscope.)

Tensile elongation at maximum load of the film was measured using the test method described above using three replicates, and the average was 239%, and the maximum load was 12.2 N. Permanent set of the film was measured using the test method described above using three replicates. The average of three samples was 9%. Load 1 at 100% elongation=3.4 N, Load 2 at 100% elongation=2.8 N.

The elongation to break, elongation at maximum load, maximum load, permanent set, load 1 at 100% elongation and load 2 at 100% elongation for the laminates of Examples 13 to 16 are shown in Table 3, below.

TABLE 3

| Example | Elongation to Break (%) | Elongation at Max load (%) | Max load (N) | Permanent set (%) | Load 1 at 100% (N) | Load 2 at 100% (N) |
|---|---|---|---|---|---|---|
| 13 | 154 | 139 | 9.01 | 21.9 | 6.50 | 4.89 |
| 14 | 143 | 139 | 8.53 | 15.3 | 5.85 | 4.63 |
| 15 | 150 | 134 | 9.53 | 21.6 | 7.08 | 5.35 |
| 16 | 151 | 125 | 9.32 | 17.4 | 5.71 | 4.65 |

Examples 17 to 20

Examples 17 to 20 were prepared using the method of Examples 9 to 12 with the following modifications. The extruder feeding the third cavity was loaded with a mixture of 69% styrene isoprene styrene block copolymer pellets obtained from Kraton Polymers under the trade designation "KRATON D1114 P" and 31% of a tackifying resin obtained from ExxonMobil under the trade designation "ESCOREZ 1310LC". The quench takeaway speed was 13.4 m/minute. The basis weight of film was about 39 grams per square meter.

Using an optical microscope, the following film dimensions were measured:
   width of first regions=634 micrometers
   width of strands=261 micrometers
   thickness of sheath=less than 6 micrometers (Due to the size of the sheath and the lack of color contrast, the thickness of sheath was estimated with the 200× optical microscope.)

Tensile elongation at maximum load of the film was measured using the test method described above using three replicates, and the average was 300%, and the maximum load was 15.8 N. Permanent set of the film was measured using the test method described above using three replicates. The average of three samples was 14%. Load 1 at 100% elongation=5.5 N, Load 2 at 100% elongation=4.1 N.

The elongation to break, elongation at maximum load, maximum load, permanent set, load 1 at 100% elongation and load 2 at 100% elongation for the laminates of Examples 17 to 20 are shown in Table 4, below.

TABLE 4

| Example | Elongation to Break (%) | Elongation at Max load (%) | Max load (N) | Permanent set (%) | Load 1 at 100% (N) | Load 2 at 100% (N) |
|---|---|---|---|---|---|---|
| 17 | 188 | 187 | 13.30 | 21.6 | 7.91 | 5.77 |
| 18 | 188 | 186 | 13.66 | 17.0 | 7.45 | 5.71 |
| 19 | 102 | 77 | 6.70 | 23.8 | 8.45 | 6.20 |
| 20 | 117 | 113 | 8.34 | 20.1 | 7.84 | 5.91 |

Illustrative Examples 5 to 8

An elastic film available from 3M Company, St. Paul, Minn., under the trade designation "B430 ELASTIC FILM", which includes an elastomeric core layer between two less elastic skin layers, was laminated between two layers of 25 gsm spunlace nonwoven obtained from Sandler AG under the trade designation "SAWATEX 22628" or two layers of 22 gsm hydrophobic carded nonwoven obtained from Fitesa with item number "C1223" and style "570D". The elastic film was multi-layer in the thickness direction, but each layer extended across the width of the film. A sandwich of the elastic film between two layers of nonwoven was nipped at 200 psi (1.4×10$^6$ Pa) between a smooth steel roll and a patterned roll with raised bonding sites making up 14% to 17% of its surface area. Both rolls were at 75° F. (24° C.) or 125° F. (52° C.). The nonwoven, bonding temperature, elongation to break, elongation at maximum load, maximum load, and permanent set for the laminates of Illustrative Examples (Ill. Ex.) 5 to 8 are shown in Table 5, below. Maximum load was the point at which delamination occurred for each of the samples. The film kept stretching after delamination of the nonwoven.

TABLE 5

| Example | Nonwoven supplier | Bonding Temp. (° C.) | Elongation at Max load (%) | Elongation to Break (%) | Max load (N) | Permanent set (%) |
|---|---|---|---|---|---|---|
| Ill. Ex. 5 | Sandler | 24 | 243 | 431 | 6.78 | 24.4 |
| Ill. Ex. 6 | Fitesa | 24 | 173 | 536 | 5.65 | 17.5 |
| Ill. Ex. 7 | Sandler | 52 | 234 | 339 | 7.20 | 26.1 |
| Ill. Ex. 8 | Fitesa | 52 | 278 | 524 | 7.07 | 19.8 |

Film Example A

Example 9 was carried out as described in Example 1 with the following modifications. The extruder feeding the first cavity was loaded with a mixture of 25% propylene resin "EXXONMOBIL PP1024E4" from ExxonMobil and 75% polypropylene resin "3376" from Total with less than 5% white concentrate in polypropylene. The extruder feeding the third cavity was loaded with styrene isoprene styrene block copolymer pellets (obtained under the trade designation "KRATON D1114 P" polymer from Kraton Polymers). The extruder feeding the second cavity was loaded with polypropylene resin "EXXONMOBIL PP1024E4" obtained from Exxon Mobil and less than 5% by weight white concentrate in polypropylene. The flow rate of first polymer was 0.27 kg/hr. The flow rate of second polymer was 20.5 kg/hr, and the flow rate of the third polymer was 6.71 kg/hr. At 10 lbs/inch/hour (10.7 kg/cm/hour) a 12 micrometer thick film was made at 300 feet per minute (91 meters per minute). No draw resonance was observed. The basis weight of the film was 41.7 gsm.
Using an optical microscope, the following film dimensions were measured:
width of first regions=1001 micrometers
width of strands=411 micrometers
thickness of sheath=2.07 micrometers

Film Example B

Example 10 was made according to the method of Film Example A with the modification the film was made at 400 feet per minute (122 meters per minute), and the extruders feeding both the first and second cavities extruded a mixture of 75% propylene resin "EXXONMOBIL PP1024E4" obtained from ExxonMobil and 25% polypropylene resin "3376" obtained from Total Petrochemicals with less than 5% white concentrate in polypropylene. No draw resonance was observed. The basis weight of the film was 25.0 gsm.
Using an optical microscope, the following film dimensions were measured:
width of first regions=1697 micrometers
width of strands=393 micrometers
thickness of sheath=3.14 micrometers

Comparative Film Example

The Comparative Film Example was carried out as described in Example 1 of Int. Pat. App. Pub. No. WO 2011/119323 (Ausen et al.) with the following modifications. The thickness of the shims was 4 mils (0.102 mm) for shims with connection to the first cavity, 2 mils (0.051 mm) for shims with connection to the second cavity, and 2 mils (0.051 mm) for spacers that did not have a connection to either cavity. The extruder feeding the first cavity was 75% by weight polypropylene resin (obtained under the trade designation "3376" from Total Petrochemicals) and approximately 25% by weight polypropylene resin (obtained under the trade designation "EXXONMOBIL PP1024E4" from ExxonMobil), and 5% white concentrate in polypropylene. The extruder feeding the second cavity was filed with styrene isoprene styrene block copolymer pellets (obtained under the trade designation "KRATON G1643 M" polymer from Kraton Polymers). The maximum takeaway speed that could be achieved before reaching the maximum pressure of 4500 psi (31 megapascals) was 15 feet per minute (4.6 meters per minute). The basis weight of the film was 39 gsm. Using an optical microscope, the following film dimensions were measured:
width of first regions=200 micrometers
width of strands=40 micrometers
Elongation to break was measured using the test method described above using three replicates, and the average was 240%. Permanent set was measured using the test method described above using three replicates, and the average was 8.2%. Load 1 at 50% elongation=1.59 N, Load 2 at 50% elongation=0.92 N, Unload 2 at 50% elongation=0.68 N.

Prophetic Example Films C-F (P.E. C to F)

The following resins can be used to make films according to the present disclosure using any of the methods described above for Examples 1, 2, 5, and 9 to 12. For each of the Prophetic Examples C to F, the sheath polymer composition can be a 50/50 blend of the 1$^{st}$ Polymeric Composition and the Elastic Polymeric Composition, or the sheath can be made from the 1$^{st}$ Polymeric Composition. Using the method of U.S. Pat. No. 4,435,141 (Weisner et al.), the sheath may be absent. Using the method of U.S. Pat. No. 5,773,374 (Wood et al.), the 1$^{st}$ Polymeric Composition may be a matrix around strands of the Elastic Polymeric Composition. Laminates can be made with these films using any of the methods described above for Examples 1 to 20.

| Example Film | 1st Polymeric Composition | Elastic Polymeric Composition |
|---|---|---|
| P.E. C | poly(ethylene terephthalate) | "DUPONT HYTREL" polyester, available from E. I. DuPont de Nemours and Co. |
| P.E. D | polycarbonate | "KURARAY LA4285" acrylic elastomer, available from Kuraray Co., Ltd., Tokyo, Japan |
| P.E. E | "IROGRAN A60 E 4902" polyurethane, available from Huntsman Corporation, Salt Lake City, Utah | "IROGRAN PS440" polyurethane, available from Huntsman Corp. |
| P.E. F | "EXXONMOBIL PP1024E4" polypropylene | "VISTAMAXX 6202" propylene elastomer, available from ExxonMobil |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An incrementally activated laminate comprising:
    an incrementally activated fibrous web having an activation pitch; and
    a film comprising alternating first and second regions laminated to the incrementally activated fibrous web, wherein the first regions comprise a first polymeric composition, wherein the second regions comprise an elastic polymeric composition that is more elastic than the first polymeric composition, wherein a distance between midpoints of two first regions separated by one second region is smaller than the activation pitch, and wherein the first regions are not plastically deformed.

2. The incrementally activated laminate of claim 1, wherein the first regions make up a higher volume percentage of the film than the second regions.

3. The incrementally activated laminate of claim 1, wherein the second regions are strands comprising a core and a sheath, wherein the core comprises the elastic polymeric composition and is more elastic than the sheath.

4. The incrementally activated laminate of claim 1, wherein the second regions comprise strands of the elastic polymeric composition embedded in a matrix of the first polymeric composition that is continuous with the first regions.

5. The incrementally activated laminate of clam 1, wherein the first and second regions are alternating side-by-side stripes comprising the first polymeric composition and the elastic polymeric composition, respectively.

6. The incrementally activated laminate of claim 1, wherein the incrementally activated fibrous web is an incrementally activated nonwoven web.

7. The incrementally activated laminate of claim 1, wherein the distance between midpoints of the two first regions separated by one second region is up to 11 millimeters, and wherein the second regions each have a width up to 4 millimeters.

8. The incrementally activated laminate of claim 1, comprised in an absorbent article.

9. A method of making an incrementally stretched laminate, the method comprising:
    laminating a fibrous web and a film comprising alternating first and second regions to form a laminate, wherein the first regions comprise a first polymeric composition, and the second regions comprise an elastic polymeric composition that is more elastic than the first polymeric composition; and
    passing the laminate between intermeshing surfaces to provide an incrementally stretched laminate, wherein a distance between midpoints of two first regions separated by one second region is smaller than the pitch of one of the intermeshing surfaces, and wherein the first regions are not plastically deformed.

10. The method of claim 9, wherein the first regions make up a higher volume percentage of the film than the second regions.

11. The method of claim 9, wherein the second regions are strands comprising a core and a sheath, wherein the core comprises the elastic polymeric composition and is more elastic than the sheath.

12. The method of claim 9, wherein the second regions comprises strands of the elastic polymeric composition embedded in a matrix of the first polymeric composition that is continuous with the first regions.

13. The method of clam 9, wherein the first and second regions are alternating side-by-side stripes of the first polymeric composition and the elastic polymeric composition, respectively.

14. The method of claim 9, wherein the intermeshing surfaces are on corrugated rolls.

15. The method of claim 9, wherein the intermeshing surfaces are on intermeshing discs.

16. The method of claim 9, wherein the fibrous web is a nonwoven web.

\* \* \* \* \*